(12) United States Patent
Coleman et al.

(10) Patent No.: US 10,896,000 B2
(45) Date of Patent: *Jan. 19, 2021

(54) SUBMISSION QUEUE COMMANDS OVER FABRICS

(71) Applicant: Pure Storage, Inc., Mountain View, CA (US)

(72) Inventors: Gordon James Coleman, Los Altos, CA (US); Roland Dreier, Mountain View, CA (US); Peter E. Kirkpatrick, Mountain View, CA (US)

(73) Assignee: Pure Storage, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/001,827

(22) Filed: Jun. 6, 2018

(65) Prior Publication Data

US 2018/0285024 A1     Oct. 4, 2018

Related U.S. Application Data

(63) Continuation of application No. 15/667,529, filed on Aug. 2, 2017, now Pat. No. 10,019,201, which is a
(Continued)

(51) Int. Cl.
    *G06F 3/06*     (2006.01)
    *G06F 9/48*     (2006.01)
    *H04L 29/08*     (2006.01)

(52) U.S. Cl.
    CPC ............ *G06F 3/0659* (2013.01); *G06F 3/061* (2013.01); *G06F 3/067* (2013.01); *G06F 9/4881* (2013.01); *H04L 67/1097* (2013.01); *H04L 67/32* (2013.01)

(58) Field of Classification Search
CPC .... G06F 3/067; G06F 3/0683; G06F 11/1464; G06F 11/1448; G06F 17/30575
See application file for complete search history.

(56) References Cited

U.S. PATENT DOCUMENTS

| 6,260,120 B1 | 7/2001 | Blumenau |
| 6,286,056 B1 | 9/2001 | Edgar et al. |

(Continued)

FOREIGN PATENT DOCUMENTS

WO     2012129191 A2     9/2012

OTHER PUBLICATIONS

International Search Report and Written Opinion dated Jan. 5, 2018 for International application No. PCT/US2017/055205.

(Continued)

*Primary Examiner* — Henry Tsai
*Assistant Examiner* — Christopher A Daley
(74) *Attorney, Agent, or Firm* — Womble Bond Dickinson (US) LLP

(57) ABSTRACT

A method includes receiving, by a storage drive and from a storage controller, a modified first submission queue command including a first logical unit identifier. The first submission queue command includes a first host identifier to identify a first host controller was previously received by the storage controller from the first host controller. The first submission queue command was modified by the storage controller to replace the first host identifier with the first logical unit identifier. The method also includes responsive to receiving the modified first submission queue command, identifying, by the storage drive, a first logical unit of storage based on the first logical unit identifier of the modified submission queue command. The method includes granting, by the storage drive, a reservation for access to the storage drive on behalf of the first host controller by asso-
(Continued)

ciating the reservation for the first logical unit with a second logical unit of storage.

20 Claims, 9 Drawing Sheets

Related U.S. Application Data continuation of application No. 15/419,886, filed on Jan. 30, 2017, now Pat. No. 9,747,039.

(60) Provisional application No. 62/404,109, filed on Oct. 4, 2016.

(56) References Cited

U.S. PATENT DOCUMENTS

| | | | |
|---|---|---|---|
| 6,804,703 B1 | 10/2004 | Allen et al. | |
| 6,954,881 B1 | 10/2005 | Flynn Jr. et al. | |
| 7,139,907 B2 | 11/2006 | Bakke et al. | |
| 7,272,674 B1 | 9/2007 | Nandi et al. | |
| 7,313,636 B2 | 12/2007 | Qi | |
| 7,577,802 B1 | 8/2009 | Parsons | |
| 8,103,754 B1 | 1/2012 | Luong et al. | |
| 8,301,811 B1 | 10/2012 | Wigmore et al. | |
| 8,645,649 B2 | 2/2014 | Kaiya et al. | |
| 9,063,937 B2 | 6/2015 | McDowell et al. | |
| 9,112,890 B1 | 8/2015 | Ori | |
| 9,294,567 B2 | 3/2016 | Hussain et al. | |
| 9,430,412 B2 | 8/2016 | Huang | |
| 9,501,245 B2 | 11/2016 | Hussain et al. | |
| 9,565,269 B2 | 2/2017 | Malwankar et al. | |
| 2002/0129246 A1 | 9/2002 | Blumenau et al. | |
| 2003/0188233 A1 | 10/2003 | Lubbers et al. | |
| 2008/0034167 A1 | 2/2008 | Sharma et al. | |
| 2011/0161299 A1 | 6/2011 | Prahlad et al. | |
| 2014/0075440 A1* | 3/2014 | Prahlad | G06F 9/4856 718/1 |
| 2015/0006663 A1* | 1/2015 | Huang | G06F 13/4221 709/213 |
| 2015/0019798 A1 | 1/2015 | Huang | |
| 2015/0319237 A1* | 11/2015 | Hussain | G06F 3/0605 709/217 |
| 2015/0331624 A1* | 11/2015 | Law | G06F 12/10 711/103 |
| 2016/0224429 A1 | 8/2016 | Prahlad et al. | |
| 2017/0024166 A1 | 1/2017 | Singh et al. | |

OTHER PUBLICATIONS

Ouyang, J. et al. (Mar. 1-5, 2014) "SDF: Software-Defined Flash for Web-Scale Internet Storage Systems", ASPLOS 2014, 14 pages.

Zhang, J. et al. (2016) "Application-Aware and Software-Defined SSD Scheme for Tencent Large-Scale Storage System" 2016 IEEE 22nd International Conference on Parallel and Distributed Systems, 482-490.

NVM Express; NVM Express over Fabrics, Revision 1.0, Jun. 5, 2016, 49 pages.

NVM Express; NVM Express, Revision 1.2.1, Jun. 5, 2015; 217 pages.

\* cited by examiner

SUBMISSION QUEUE COMMANDS OVER FABRICS

RELATED APPLICATIONS

The present application is a continuation of U.S. patent application Ser. No. 15/667,529, filed Aug. 2, 2017, which is a continuation of U.S. patent application Ser. No. 15/419,886, filed Jan. 30, 2017, which claims the benefit of U.S. Provisional Patent Application No. 62/404,109, filed Oct. 4, 2016, all of which are incorporated by reference herein.

BACKGROUND

Storage systems, such as enterprise storage systems, may include a centralized or de-centralized repository for data that provides common data management, data protection, and data sharing functions, for example, through connections to computer systems.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
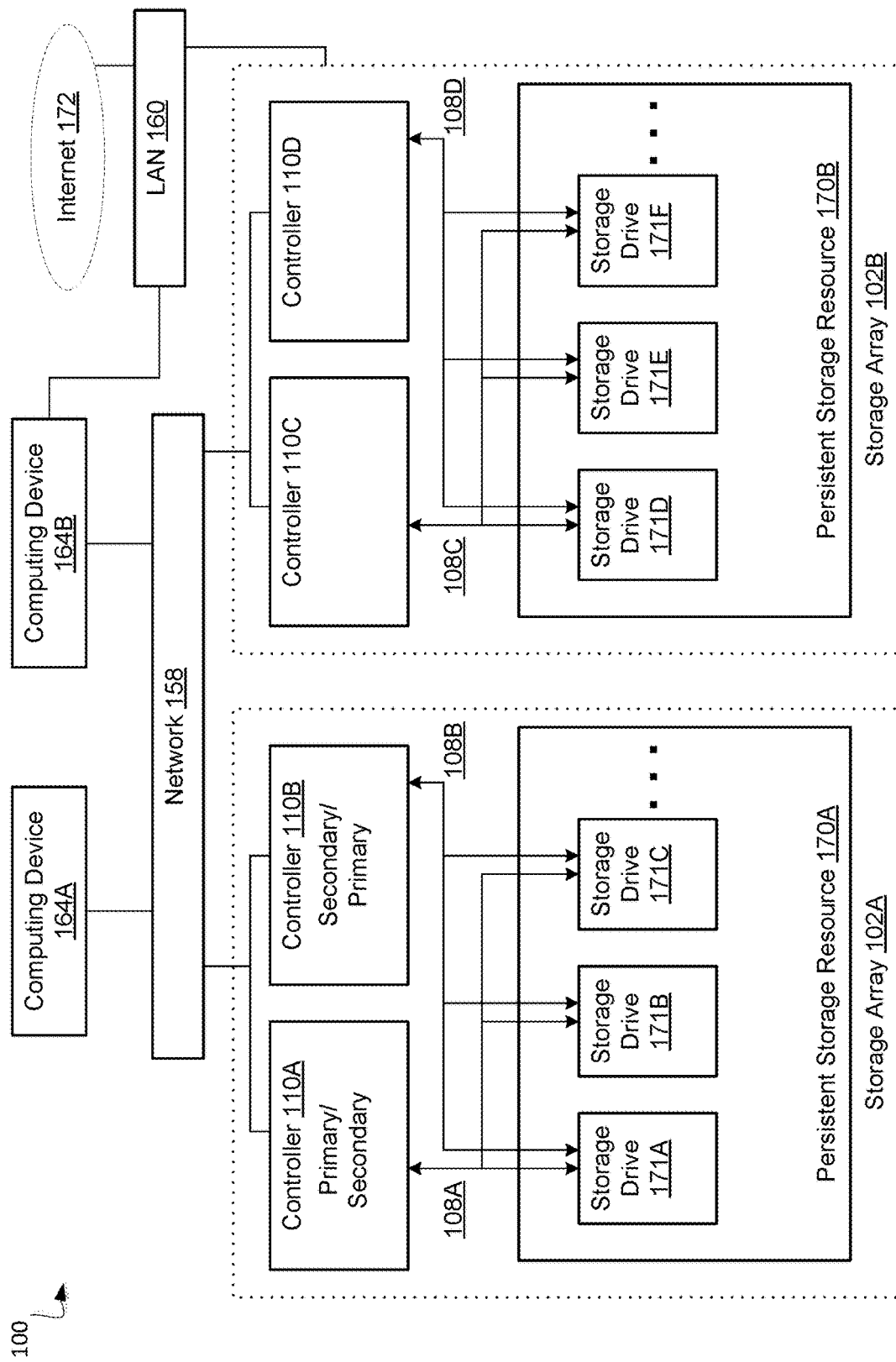
FIG. 1 illustrates an example system for data storage, in accordance with some implementations.

In some systems, such as enterprise storage systems using multiple host controllers, a reservations system may be implemented to control access to shared devices, such as storage drives. An initiator (e.g., host controller) may set a reservation on a logic unit of a storage drive to prevent another initiator (e.g., a different host controller) from making changes to the logical unit. In implementations, a logical unit of storage may logically identify a quantity of storage, such as a quantity of non-volatile (NV) memory of a storage drive. Some storage systems may implement multiple stages of communications to handle reservations. For example, a host controller of a storage array may send a reservation to a storage controller (e.g., a first stage) of a different storage array over Ethernet. The storage controller may communicate the reservation in a different protocol than the first stage to a drive controller (e.g., second stage) of the storage drive. Systems, such as storage systems, having multiple stages over which a reservation is passed presents challenges. In some instances, a reservation may not be passed directly through the first stage to the second stage because the protocol of the first stage may not be compatible with the second stage. In some instances, reservation management may be handled by one or more of the different stages, e.g., stage 1 storage controllers or stage 2 drive controllers. Coordinated communication between different stages and within the same stage presents additional challenges, in particular when multiple communication paths and multiple controllers are used within a stage. Great care must be taken to ensure that multiple host controllers do not have the same access to a storage drive at the same time, which may result in data corruption.

Aspects of the present disclosure address the above-mentioned and other deficiencies by modifying a reservation at a first stage and tying the modifying reservation for one logical unit to another logical unit at the storage drive.

In some implementations, a storage controller may receive, from the first host controller, a reservation command to acquire access to a storage drive that is shared by a second host controller of the multi-host storage system. The reservation command includes a first host identifier to identify the first host controller. The storage controller may modify the first reservation command by replacing the first host identifier with a first logical unit identifier that is associated with the first host controller and that identifies a first logical unit of storage of the storage drive. The storage controller may send, to the drive controller, the modified first reservation command including the first logical unit identifier to a drive controller of the storage drive. The drive controller may grant a reservation for the access to the storage drive on behalf of the first host controller based on the first logical unit identifier.

It may be noted that aspects of the present disclosure address the above-mentioned and other deficiencies using different implementations as described herein.

FIG. 1 illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164. Computing devices (also referred to as "client devices" herein) may be for example, a server in a data center, a workstation, a personal computer, a notebook, or the like. Computing devices 164 are coupled for data communications to one or more storage arrays 102 through a network 158, such as a storage area network (SAN), or a local area network (LAN) 160.

The network 158 may be implemented as any number of physical networks, such as a LAN or SAN. The network 158 may be implemented with a variety of data communications fabrics, devices, and protocols. For example, the fabrics for network 158 may include Fibre Channel, Ethernet, Infiniband, Serial Attached Small Computer System Interface (SAS), or the like. Data communications protocols for use with network 158 may include Advanced Technology Attachment (ATA), Fibre Channel Protocol, Small Computer System Interface (SCSI), Internet Small Computer System Interface (iSCSI), HyperSCSI, Non-Volatile Memory Express (NVMe) over Fabrics, or the like. It may be noted that network 158 is provided for illustration, rather than limitation. Other data communication couplings may be implemented between computing devices 164 and storage arrays 102.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol (TCP), User Datagram Protocol (UDP), Internet Protocol (IP), Hyper-Text Transfer Protocol (HTTP), Wireless Access Protocol (WAP), Handheld Device Transport Protocol (HDTP), Session Initiation Protocol (SIP), Real Time Protocol (RTP), or the like.

Storage arrays 102 may provide persistent data storage for the computing devices 164. Storage array 102A may be contained in a chassis (not shown), and storage array 102B may be contained in another chassis (not shown), in implementations. Storage array 102A and 102B may include one or more storage array controllers 110 (also referred to as "controller" herein). A storage array controller 110 may be embodied as a module of automated computing machinery comprising computer hardware, computer software, or a combination of computer hardware and software. In some implementations, the storage array controllers 110 may be configured to carry out various storage tasks. Storage tasks may include writing data received from the computing devices 164 to storage array 102, erasing data from storage array 102, retrieving data from storage array 102 and providing data to computing devices 164, monitoring and reporting of disk utilization and performance, performing redundancy operations, such as Redundant Array of Independent Drives (RAID) or RAID-like data redundancy operations, compressing data, encrypting data, and so forth.

Storage array controller 110 and drive controllers (described with respect to FIG. 3) may be implemented in a variety of ways, including as a Field Programmable Gate Array (FPGA), a Programmable Logic Chip (PLC), an Application Specific Integrated Circuit (ASIC), System-on-Chip (SOC), or any computing device that includes discrete components such as a processing device, central processing unit, computer memory, or various adapters. Storage array controller 110 may include, for example, a data communications adapter configured to support communications via the network 158 or LAN 160. In some implementations, storage array controller 110 may be independently coupled to the LAN 160. In implementations, storage array controller 110 may include an I/O controller or the like that couples the storage array controller 110 for data communications, through a midplane (not shown), to a persistent storage resource 170 (also referred to as a "storage resource" or "shelf" herein). The persistent storage resource 170 main include any number of storage drives 171 (also referred to as "storage devices" or "storage modules" herein) and any number of non-volatile Random Access Memory (NVRAM) devices (not shown).

In some implementations, the NVRAM devices of a persistent storage resource 170 may be configured to receive, from the storage array controller 110, data to be stored in the storage drives 171. In some examples, the data may originate from computing devices 164. In some examples, writing data to the NVRAM device may be carried out more quickly than directly writing data to the storage drive 171. In implementations, the storage array controller 110 may be configured to utilize the NVRAM devices as a quickly accessible buffer for data destined to be written (e.g., flushed) to the storage drives 171. Latency for write requests using NVRAM devices as a buffer may be improved relative to a system in which a storage array controller 110 writes data directly to the storage drives 171. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171.

In implementations, storage drive 171 may refer to any device configured to record data persistently, where "persistently" or "persistent" refers as to a device's ability to maintain recorded data after loss of power. In some implementations, storage drive 171 may correspond to non-disk storage media. For example, the storage drive 171 may be one or more solid-state drives (SSDs), flash memory based storage, any type of solid-state non-volatile memory, or any other type of non-mechanical storage device. In other implementations, storage drive 171 may include may include mechanical or spinning hard disk, such as hard-disk drives (HDD). In implementations, a storage drive 171 may contain one or more physical packages (e.g., packages with pins to connect to a circuit board) where each physical package contains one or more non-volatile memory die.

In some implementations, the storage array controllers 110 may be configured for offloading device management responsibilities from storage drive 171 in storage array 102. For example, storage array controllers 110 may manage control information that may describe the state of one or more memory blocks in the storage drives 171. The control information may indicate, for example, that a particular memory block has failed and should no longer be written to, that a particular memory block contains boot code for a storage array controller 110, the number of program-erase (P/E) cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171 may be stored in one or more particular memory blocks of the storage drives 171 that are selected by the storage array controller 110. The selected memory blocks may be tagged with an identifier indicating that the selected memory block contains control information. The identifier may be utilized by the storage array controllers 110 in conjunction with storage drives 171 to quickly identify the memory blocks that contain control information. For example, the storage controllers 110 may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171.

In implementations, storage array controllers 110 may offload device management responsibilities from storage drives 171 of storage array 102 by retrieving, from the storage drives 171, control information describing the state of one or more memory blocks in the storage drives 171. Retrieving the control information from the storage drives 171 may be carried out, for example, by the storage array controller 110 querying the storage drives 171 for the location of control information for a particular storage drive 171. The storage drives 171 may be configured to execute instructions that enable the storage drive 171 to identify the location of the control information. The instructions may be executed by a controller (not shown) associated with or otherwise located on the storage drive 171 and may cause the storage drive 171 to scan a portion of each memory block to identify the memory blocks that store control information for the storage drives 171. The storage drives 171 may respond by sending a response message to the storage array controller 110 that includes the location of control information for the storage drive 171. Responsive to receiving the response message, storage array controllers 110 may issue a request to read data stored at the address associated with the location of control information for the storage drives 171.

In other implementations, the storage array controllers 110 may further offload device management responsibilities from storage drives 171 by performing, in response to receiving the control information, a storage drive management operation. A storage drive management operation may include, for example, an operation that is typically performed by the storage drive 171 (e.g., the controller (not shown) associated with a particular storage drive 171). A storage drive management operation may include, for example, ensuring that data is not written to failed memory blocks within the storage drive 171, ensuring that data is written to memory blocks within the storage drive 171 in such a way that adequate wear leveling is achieved, and so forth.

It may be noted that in other implementations, some device management responsibilities may be moved to storage drive 171. For example, storage drive 171 may handle the arbitration of reservation commands and input-output (I/O) commands sent by controller 110. In some implementations, I/O commands may include a write command, a read command, or a flush command (e.g., move data stored on NVRAM to storage drive 171). Other I/O commands may be implemented. Additional details of reservation arbitration are further described at least with respect to FIG. 2.

In implementations, storage array 102 may implement two or more storage array controllers 110. In some implementations, storage array 102 may implement multiple host controllers in a multi-host storage system. For example, storage array 102A may include storage array controllers 110A and storage array controllers 110B (also referred to as "host controller 110A" and "host controller 110B" respectively, herein). At a given instance, a single storage array controller 110 (e.g., storage array controller 110A) of a storage system 100 may be designated with primary status (also referred to as "primary controller" or "primary host controller" herein), and other storage array controllers 110 (e.g., storage array controller 110A) may be designated with secondary status (also referred to as "secondary controller" or "secondary host controller" herein). The status of storage array controllers 110 may change during run-time. For example, storage array controller 110A may be designated with secondary status, and storage array controller 110B may be designated with primary status.

In implementations, the primary controller may have a particular access (e.g., access rights) to persistent storage resource 170, such as permission to alter data (e.g., write) in persistent storage resource 170 while excluding the same access to the secondary controller. In some implementation, the access rights may include write access, read access, erase access, or read-write access. It may be noted that different access rights may also be implemented, such as write exclusive access, exclusive access, write exclusive access—registrants only, exclusive access-registrants only, write exclusive access—all registrants, exclusive access—all registrants, for example. In implementations, at least some of the access rights of the primary controller may supersede the rights of the secondary controller. For instance, the secondary controller may not have permission to write data in persistent storage resource 170 when the primary controller has the write access.

In some implementations, a primary controller, such as storage array controller 110A, may serve as the primary controller for one or more storage arrays 102, and a second controller, such as storage array controller 110B, may serve as the secondary controller for the one or more storage arrays 102. For example, storage array controller 110A may be the primary controller for storage array 102A and storage array 102B, and storage array controller 110B may be the secondary controller for storage array 102A and 102B. In some implementations, a primary controller, such as storage array controller 110A, may serve as the primary controller for one or more storage drives 171 of storage arrays 102, and a second controller, such as storage array controller 110B, may serve as the primary controller for one or more storage drives 171 of storage arrays 102 for which storage array controller 110A does not have primary status. It may be noted that in implementations, either storage array controller 110A or storage array controller 110B may be the primary controller for a particular storage drive 171, but not both. Both storage array controller 110A and storage array controller 110B having primary status with respect to a particular storage drive 171 or storage array may result in corruption of data, for example.

In some implementations, storage array controllers 110C and 110D (also referred to as "storage processor modules" or "storage controller" herein) may neither have primary or secondary status. Storage array controllers 110C and 110D, implemented as storage processor modules, may act as a communication interface between the primary and secondary controllers (e.g., storage array controllers 110A and 110B, respectively) and storage array 102B. For example, storage array controller 110A of storage array 102A may send a write request, via network 158, to storage array 102B. The write request may be received by both storage array controllers 110C and 110D of storage array 102B (e.g., multi-path). Storage array controllers 110C and 110D may facilitate the communication, e.g., send the write request to the appropriate storage drive 171. It may be noted that in some implementations storage processor modules may be used to increase the number of storage drives controlled by the primary and secondary controllers.

In implementations, storage array controllers 110 are communicatively coupled, via a midplane (not shown), to one or more storage drives 171 and to one or more NVRAM devices (not shown) that are included as part of a storage array 102. The storage array controllers 110 may be coupled to the midplane via one or more data communications links and the midplane may be coupled to the storage drives 171 and the NVRAM devices via one or more data communications links. The data communications links described above are collectively illustrated by data communications links 108 and may include a Peripheral Component Interconnect Express (PCIe) bus, for example.

In some implementations, system 100 may be designed with principles of high availability (HA) architecture. High availability may refer to systems that are durable and designed to operate continuously by accommodating for failure using redundant components. For example, a multi-host storage system using controller 110A and 110B may accommodate the failure of one controller (e.g., controller 110A or controller 110B) and continuously perform the designated operations for system 100. Similarly, implementing multiple storage processor modules, such as storage array controller 110C and storage array controller 110B, may accommodate the failure of one of the storage processor modules.

It may be noted that readers will appreciate that the storage systems, such as system 100, and the components that are contained in such storage systems, as described in the present disclosure, are included for explanatory purposes and do not represent limitations as to the types of systems that may accumulate application-level statistics. In fact, storage systems configured for accumulating application-level statistics may be embodied in many other ways and may include fewer, additional, or different components. For example, storage within storage systems configured for accumulating application-level statistics may be embodied as block storage where data is stored in blocks, and each block essentially acts as an individual hard drive. Alternatively, storage within storage systems configured for accumulating application-level statistics may be embodied as object storage, where data is managed as objects. Each object may include the data itself, a variable amount of metadata, and a globally unique identifier, where object storage can be implemented at multiple levels (e.g., device level, system level, interface level). In addition, storage within storage systems configured for accumulating application-level statistics may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

Figure 2:
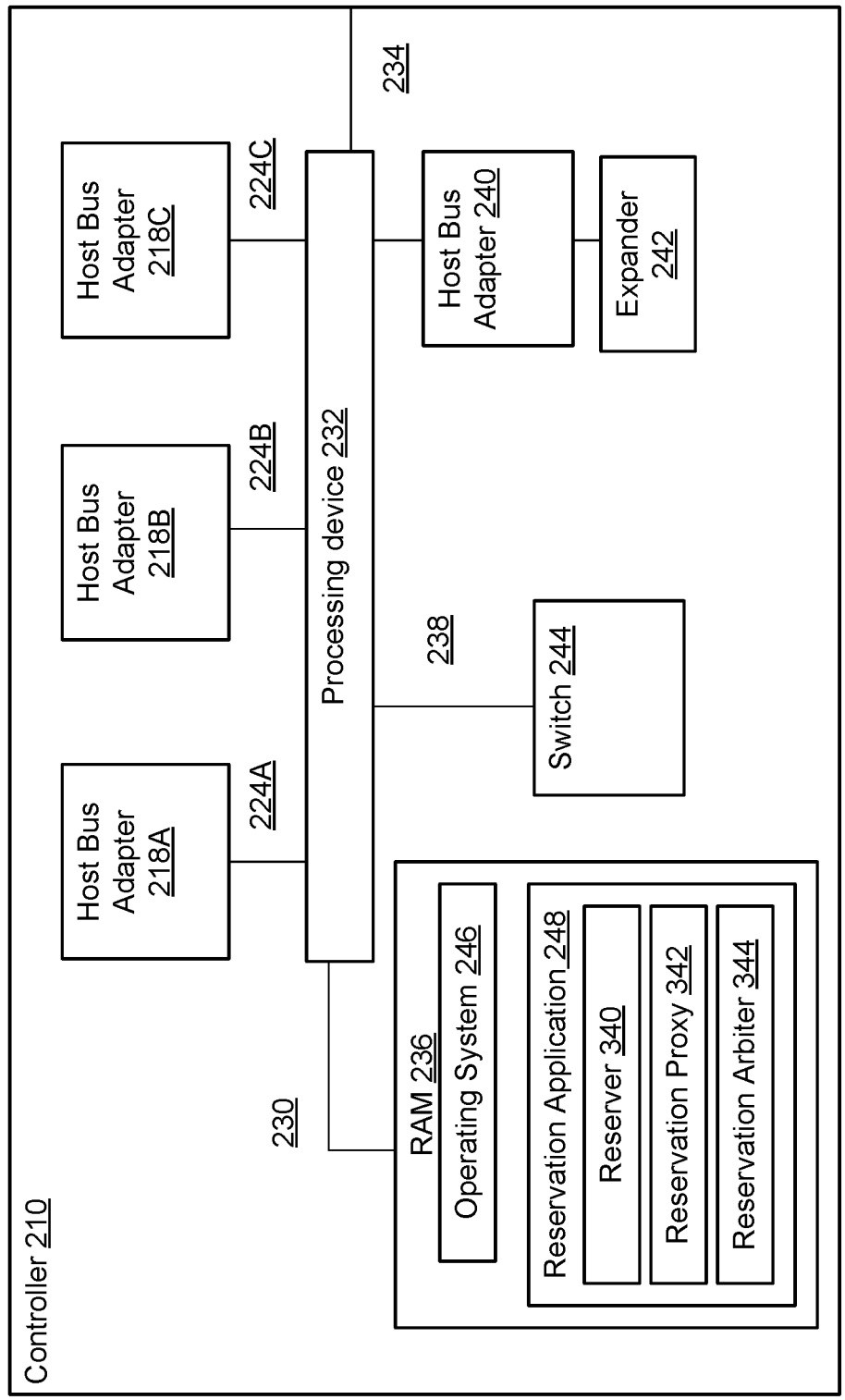
FIG. 2 illustrates an example system for data storage, in accordance with implementations.

FIG. 2 illustrates an example system for data storage, in accordance with some implementations. Storage array controller 210 illustrated in FIG. 2 may similar to the storage array controllers 110 described with respect to FIG. 1 or drive controllers 373 described with respect to FIG. 3. In one example, storage array controller 210 may be similar to storage array controller 110A or storage array controller 110B. Storage array controller 210 includes numerous elements for purposes of illustration rather than limitation. It may be noted that storage array controller 210 may include the same, more, or fewer elements configured in the same or different manner in other implementations. It may be noted that elements of FIG. 1 may be included below to help illustrate features of storage array controller 210.

Storage array controller 210 may include one or more processing devices 232 and random access memory (RAM) 236. Processing device 232 (or controller 210) represents one or more general-purpose processing devices such as a microprocessor, central processing unit, or the like. More particularly, the processing device 232 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 232 may also be one or more special-purpose processing devices such as an application specific integrated circuit (ASIC), a field programmable gate array (FPGA), a digital signal processor (DSP), network processor, or the like.

The processing device 232 may be connected to the RAM 236 via a data communications link 230, which may be embodied as a high speed memory bus such as a Double-Data Rate 4 (DDR4) bus. Stored in RAM 236 is an operating system 246. In some implementations, reservation application 248 is stored in RAM 236. Reservation application 248 may include computer program instructions for managing and arbitrating reservations for access to storage drives. In implementations, the storage array controller 210 may execute the reservation application 248 to perform a method of receiving, from a first host controller in a multi-host storage system and by a storage controller, a first reservation command to acquire access to a storage drive that is shared by a second host controller of the multi-host storage system, the reservation command including a first host identifier to identify the first host controller. The method also includes modifying, by the storage controller, the first reservation command by translating the first host identifier into a first logical unit identifier that is associated with the first host controller and that identifies a first logical unit of storage of the storage drive. The method also includes sending the modified first reservation command comprising the first logical unit identifier to a drive controller of the storage drive. The method responsive to receiving the modified first reservation command, granting, by the drive controller of the storage drive, a reservation for the access to the storage drive of the first logical unit of storage on behalf of the first host controller based on the first logical unit identifier. In implementations, reservation application 248, may include multiple components, such reserver 340, reservation proxy 342, and reservation arbiter. In implementations, the multiple components of reservation application 248 may execute different features of reservation application 248. In implementations, the components of reservation application may reside on or be performed by different devices or elements of a storage system, as illustrated with respect to FIG. 3.

It may be noted that the reservation application 248 and the operating system 246 shown in RAM 236 for purposes of illustration, rather than limitation. Many components of reservation application 248 or the operating system 246 may also be stored in non-volatile memory such as, for example, persistent storage resource 170 described with respect to FIG. 1.

In implementations, storage array controller 210 includes one or more host bus adapters 218 that are coupled to the processing device 232 via a data communications link 224. In implementations, host bus adapters 218 may be computer hardware that connects a host system (e.g., the storage array controller) to other network and storage arrays. In some examples, host bus adapters 218 may be a Fibre Channel adapter that enables the storage array controller 210 to connect to a SAN, an Ethernet adapter that enables the storage array controller 210 to connect to a LAN, or the like. Host bus adapters 218 may be coupled to the processing device 232 via a data communications link 224 such as, for example, a PCIe bus.

In implementations, storage array controller 210 may include a host bus adapter 240 that is coupled to an expander 242. The expander 242 may be used to attach a host system to a larger number of storage drives. The expander 242 may, for example, be a SAS expander utilized to enable the host bus adapter 240 to attach to storage drives in an implementation where the host bus adapter 240 is embodied as a SAS controller.

In implementations, storage array controller 210 may include a switch 244 coupled to the processing device 232 via a data communications link 238. The switch 244 may be a computer hardware device that can create multiple endpoints out of a single endpoint, thereby enabling multiple devices to share a single endpoint. The switch 244 may, for example, be a PCIe switch that is coupled to a PCIe bus (e.g., data communications link 238) and presents multiple PCIe connection points to the midplane.

In implementations, storage array controller 210 includes a data communications link 234 for coupling the storage array controller 210 to other storage array controllers. In some examples, data communications link 234 may be a QuickPath Interconnect (QPI) interconnect.

Figure 3:
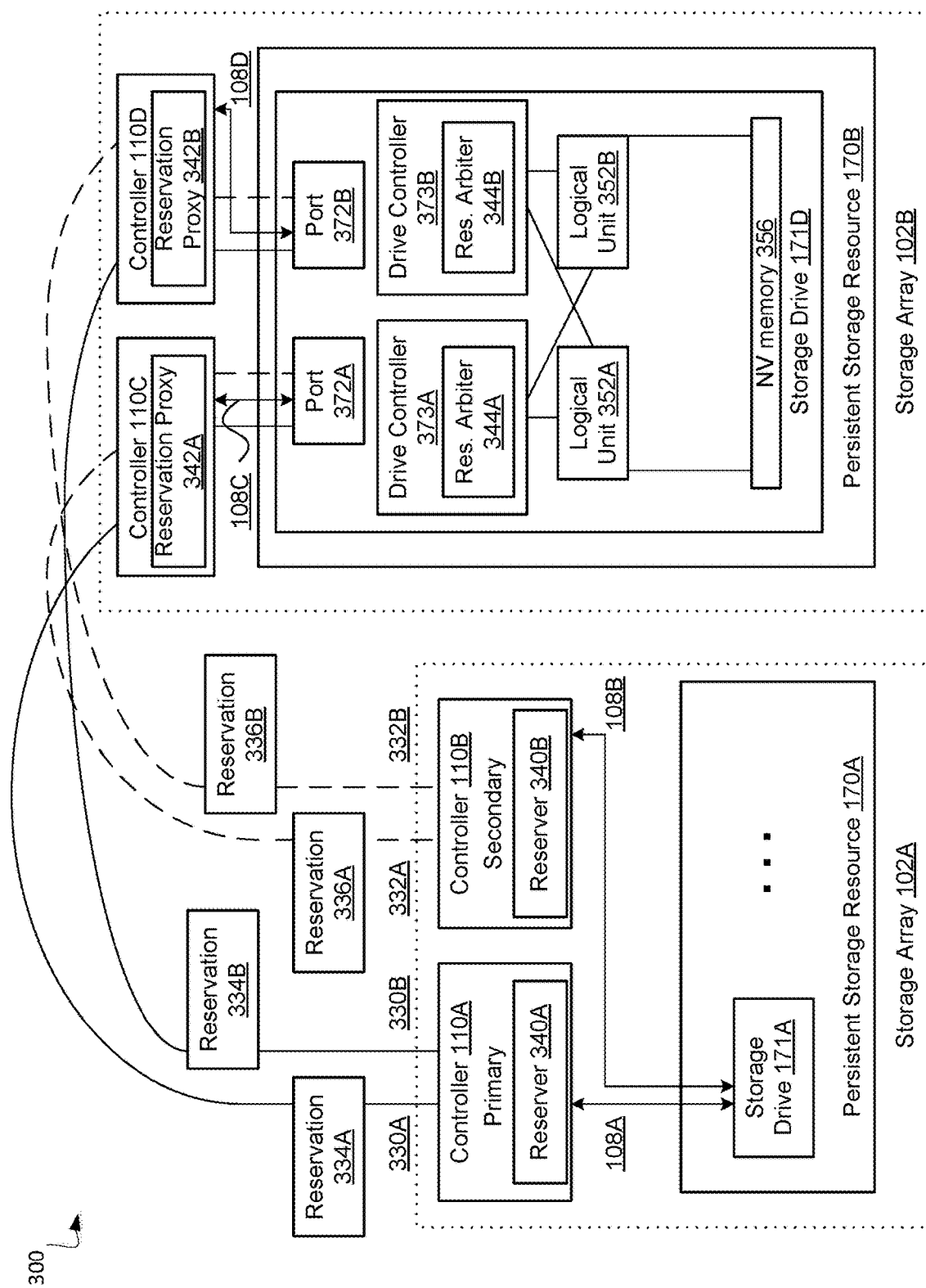
FIG. 3 illustrates an example system for managing reservations over multiple paths, in accordance with some implementations.

FIG. 3 illustrates an example system for managing reservations over multiple paths, in accordance with some implementations. In implementations, system 300 illustrated in FIG. 3 may be similar to and include similar elements as system 100 described with respect to FIG. 1. Some elements of system 100 have been included for purposes of illustration, rather than limitation. Other elements of system 100 have not been included so as not to obscure the implementation, rather than for limitation. It may be noted that system 300 may include the same, more, or fewer elements configured in the same or different manner in other implementations. For purposes of illustration, rather than limitation, in system 300 storage array controller 110A is the primary controller (e.g., primary host controller), storage array controller 110B is the secondary controller (e.g., secondary host controller in the multi-host storage system), and storage array controller 110C and 110D are storage processor modules (e.g., storage controller). It may be noted that in other implementations, storage array controllers 110 may have different statuses or functions. For purposes of illustration, rather than limitation, in system 300 persistent storage resource 170B is shown with a single storage drive 171D. In implementations, persistent storage resource 170B may include multiple storage drives 171 with similar features as described with respect to storage drive 171D. It may also be noted the operations described with respect to storage drive 171D, may be performed in a similar manner for and by additional storage drives.

In some implementations, a storage drive, such as storage drive 171D, includes one or more ports 372 (e.g., multiport storage drive). A port 372 may be coupled to a respective storage array controller 110. For example, port 372A is coupled to storage array controller 110C via data communications link 108C. Port 372B is coupled to storage array controller 110D via data communications link 108D. A port 372 may be associated with a particular drive controller 373. For example, port 372A is associated drive controller 373A. Port 372B is associated with drive controller 373B. Ports 372 may transmit data to and from the associated drive controllers 373. In implementations, communications between storage array controllers 110C and 100D and the respective driver controller 373 may be compatible with a non-fabric-based standard, such as the NVMe standard.

Drive controller 373A may have access to both logical unit of storage 352A and logical unit of storage 352B. Similarly, drive controller 373B may have access to both logical unit of storage 352A and logical unit of storage 352B. In implementations, a specific logical unit identifier identifies a particular logical unit of storage drive 171D. A logical unit identifier may be a value used to identify a specific logical unit of storage of storage drive 171. The logical unit of storage may logically identify a quantity of storage, such as a quantity of non-volatile (NV) memory 356 of storage drive 171D. In some implementations, the logical unit identifier is a namespace identifier and the logical unit is a namespace compatible with the NVMe standard.

In implementations, a total usable storage capacity of the NV memory 356 may be divided by the system 300 into one or more namespaces. For example, the usable storage capacity of K NV memory 356 may be divided into M namespaces, wherein K and M are positive integers but not necessarily equal in value. As shown in FIG. 3, M namespaces include logical unit of storage 352A (also referred to as "namespace 1") and logical unit of storage 352B (also referred to as "namespace 2"). Each namespace may represent a slice of storage capacity provided by the NV memory 356. It may be noted that each namespace may have an equal or unequal storage capacity. In implementations, namespace 1 and namespace 2 may refer to the same slice of storage capacity provided by the NV memory 356. In implementations, namespace 1 and namespace 2 may each refer to the total usable storage capacity of the NV memory 356.

In implementations, storage array controller 110A and 110B may be host controllers in a multi-host system, such as system 300. Storage array controllers 110A and 100B may send reservations for access to storage drive 171D. It may be noted that storage array controllers may send reservations for access to each of the multiple storage drives (not shown). In one implementation, storage array controller 110A and 110B may include reserver 340A and 340B, respectively. Reserver 340A and 340B may perform reservation operations on behalf of storage array controller 110A and 110B, respectively, as described herein.

In implementations, storage array controller 110A and 110B send reservations 334 and 336, respectively, to another storage array, such as storage array 102B. Reservations 334 and 336 may also be referred to as a "reservation command" herein. Reservations 334 and 336 may be requests or commands that allow two or more host controllers (e.g., storage array controller 110A and 110B) to coordinate access (e.g., read access, write access, erase access, etc.) to a storage drive, such as storage drive 171D. In implementations, reservations 334 and 336 may include commands such as reservation acquire, reservation register, reservation release, reservation report, among others. Reservations 334 and 336 may refer to a reservation acquire command herein, unless otherwise described.

In implementations, reservations 334A and 334B may include a host identifier that identifies storage array controller 110A. For example, a host identifier may be an N-bit identifier that uniquely identifies a storage array controller, such as storage array controller 110A.

In implementations, the reservations 334 and 336 may be sent via multipath. Multipath may refer to two or more physical paths between a first device (e.g., storage array controller 110A) and a target device (e.g., storage drive 171D). Multipath may improve fault-tolerance and performance, or may be part of an HA architecture. For example, reservations 334A and 334B may be sent by storage array controller 110A to storage array controller 110C and 110D, respectively. Similarly, reservations 336A and 336B may be sent by storage array controller 110B to storage array controller 110C and 110D, respectively. In implementations, reservations 334A and 334B may include the same content, but be sent to different devices, such as storage array controller 110C and 110D, respectively. Similarly, reservations 336A and 336B may include the same content, but be sent to different devices, such as storage array controller 110C and 110D, respectively.

In implementations, signal path 330A represents the signal path of reservation 334A. In signal path 330A, reservation 334A is sent by storage array controller 110A to storage array controller 110C. Similarly, in signal path 330B, reservation 334B is sent by storage array controller 110A to storage array controller 110D. In signal path 332A, reservation 336A is sent by storage array controller 110B to storage array controller 110C. In signal path reservation 336B is sent by storage array controller 110B to storage array controller 110D.

It may also be noted that in implementations the reservations 334 and 336 travel multiple stages. For example, reservation 334A is sent by storage array controller 110A to storage array controller 110C (stage 1). Storage array controller 110C may send a modified reservation to drive controller 373A (stage 2). In implementations, the protocols between of stages may be different from one another. For example, in stage 1 the storage array controller 110A may communicate to storage array controller 110C over a fabric-based network using a fabric-based protocol. Reservations 334 or 336 may be sent over a network, such as network 158 of FIG. 1. The network may be fabric-based network using data formats compatible with a particular fabric standard, such as NVMe over Fabrics. In stage 2, storage array controller 110C may communicate to drive controller 373A using a non-fabric protocol. For example, storage array controller 110C may receive reservation 334A, modify reservation 334A, and send the modified reservation 334A to storage drive 171 via data communications link 108C using a non-fabric protocol, such as NVMe. In implementations, storage array controller 110A and 110B and drive controllers 373 may not have direct knowledge of one another, and may use storage array controller 110C and 110D to associate communications from storage array controller 110A and 110B to drive controllers 373, and vice-versa.

In implementations, after a reservation is received by storage array controller 110C and 110D, reservation proxy 342 may translate or modify the received reservation. For the sake of illustration, rather than limitation, the flow of reservation 334A through system 300 will be described. It may be noted that other elements receiving reservations other than reservation 334A may perform similar operations. In implementations, reservation 334A includes a host identifier that identifies the sending host controller, such as storage array controller 110A. Reservation proxy 342A of storage array controller 110C may modify reservation 334A by changing the host identifier to a logical unit identifier that is associated with a particular storage array controller, such as storage array controller 110A.

For example, storage array controller 110C may modify reservation 334A having a host identifier identifying storage array controller 110A with a logical unit identifier identifying logical unit of storage 352A. Similarly, storage array controller 110C may modify reservation 336A having a host identifier identifying storage array controller 110B with a logical unit identifier identifying logical unit of storage 352B. Storage array controller 110C may use a table, common logic, or otherwise, to reference the received host identifier with the associated logical unit identifier.

In implementations, storage array controller 110C may also translate reservation 334A from a first protocol (e.g., fabric-based protocol) to another protocol (e.g., non-fabric protocol). In implementations, a modified reservation may refer to a reservation where at least the host identifier has been replaced with the associated logical unit identifier. In other implementations, a modified reservation may refer to a reservation where the host identifier has been replaced with the associated logical unit identifier and the reservation has been translated consistent with another communication standard.

In implementations, the storage array controller 110C sends the modified reservation 334A to storage drive 171D via port 372A. The modified reservation 334A includes a logical unit identifier that identifies logical unit of storage 325A. The modified reservation 334A is passed to drive controller 373A. Reservation arbiter 344A of drive controller 373A, responsive to receiving the modified reservation 334A, checks current reservations for access to logical unit of storage 352A. If no other reservations are held for logical unit of storage 352A and no other reservations are associated with logical unit of storage 352A, reservation arbiter 344 may grant and hold the reservation for logical unit of storage 352A based on the modified reservation 334A. In implementations, reservation arbiter 344 may associate or tie the reservation for logical unit of storage 352A to another logical unit of storage, such as logical unit of storage 352B. It may be noted that without tying the logical unit of storage 352B to the reservation for the logical unit of storage 352A, in some implementations a host controller may still be able to access logical unit of storage 352B. A reservation held for logical unit of storage 352A and associated with logical unit of storage 352A, allows storage drive 171D to grant access to both logical unit of storage 352A and 352B in response to an I/O command that includes logical unit identifier for logical unit of storage 352A, and deny access to both logical unit of storage 352A and 352B in response to an I/O command that includes a logical unit identifier of logical unit of storage 352B. A reservation held for logical unit of storage 352A and associated with logical unit of storage 352A, is a reservation to the storage drive on behalf of the storage array controller 110A, rather than storage array controller 110B. It may be noted that reservations and I/O commands including logical unit identifiers of logical units of storage that are associated with or tied to a reservation held by another logical unit of storage may be denied. In implementations where logical unit of storage 352A and logical unit of storage 352B each represent the same total usable storage capacity of the NV memory 356, a reservation held for logical unit of storage 352A and associated with logical unit of storage 352A, is a reservation to the entire storage drive on behalf of the storage array controller 110A, rather than storage array controller 110B.

It may also be noted that drive controller 373A and drive controller 373B may communicate directly or through another component, such a common logic block (not shown), to coordinate the arbitration of reservations and I/O commands. For example, to determine if a reservation has been granted for logical unit of storage 352A and associated with logical unit of storage 352A, drive controllers 373 (responsive to receiving subsequent reservations or I/O commands) may access a common logic block that keeps track of the current reservation (e.g., master reservation holder). It may also be noted that two logical units are shown for purposes of illustration rather than limitation. In other implementations, additional logical units of storage 352 may be used, for example in implementations that use three or more drive controllers 373.

In implementations, where storage drive 171D holds a reservation on behalf of storage array controller 110A (e.g., a reservation for logical unit of storage 352A that is tied to logical unit of storage 352B and without direct knowledge the reservation is on behalf of storage array controller 110A), storage drive 171D may receive additional reservation commands from storage array controller 110B (via storage array controller 110C or 110D). In one implementation, storage array controller 110C may receive from storage array controller 110B reservation 336A. Reservation 336A may be a reservation command to acquire access (e.g., the same access as storage array controller 110A has been granted) to storage drive 171D. Reservation 336A may include a different host identifier that identifies storage array controller 110B. Storage array controller 110C may determine the association between the host identifier in the reservation 336A and the appropriate logical unit identifier. Storage array controller 110C may modify reservation 336A to replace the host identifier identifying storage array controller 110B with a logical unit identifier that identifies logical unit of storage 352B. Storage array controller 110 may send the modified reservation 336A to drive controller 373A via port 372A. After receiving the modified reservation 336A, drive controller 373A may identify logical unit of storage 352B using the logical unit identifier in modified reservation 336A. Storage array controller 110A may determine that a reservation is being held for logical unit of storage 352A and the reservation is associated with logical unit of storage 352B, and deny the reservation for logical unit of storage 352B.

In implementations, where storage drive 171D holds a reservation on behalf of storage array controller 110A (e.g., a reservation for logical unit of storage 352A that is tied to logical unit of storage 352B), storage drive 171D may receive I/O commands from storage array controller 110B. In one implementation, storage array controller 110C may receive from storage array controller 110B an I/O command (e.g., write command). The I/O command may include a host identifier that identifies storage array controller 110B. Storage array controller 110A may determine the association between the host identifier in the I/O command and the appropriate logical unit identifier. Storage array controller 110C may modify the I/O command to replace the host identifier identifying storage array controller 110B with a logical unit identifier that identifies logical unit of storage 352B. Storage array controller 110C may send the modified I/O command to drive controller 373A via port 372A. After receiving the I/O command, drive controller 373A may identify logical unit of storage 352B using the logical unit identifier in I/O command. Storage array controller 110A may determine that a reservation is being held for logical unit of storage 352A and the reservation is associated with logical unit of storage 352B, and deny the execution of the I/O action (e.g., read, write, etc.) based on the modified I/O command.

In implementations, where storage drive 171D holds a reservation on behalf of storage array controller 110A (e.g., a reservation for logical unit of storage 352A that is tied to logical unit of storage 352B), storage drive 171D may receive I/O commands from storage array controller 110A. In one implementation, storage array controller 110C may receive from storage array controller 110A, an I/O command (e.g., write command). The I/O command may include a host identifier that identifies storage array controller 110A. Storage array controller 110A may determine the association between the host identifier in the I/O command and the appropriate logical unit identifier. Storage array controller 110C may modify the I/O command to replace the host identifier identifying storage array controller 110A with a logical unit identifier that identifies logical unit of storage 352A. Storage array controller 110C may send the modified I/O command to drive controller 373A via port 372A. After receiving the I/O command, drive controller 373A may identify logical unit of storage 352A using the logical unit identifier in I/O command. Storage array controller 110A may determine that the reservation is being held for logical unit of storage 352A and that the reservation is associated with logical unit of storage 352B, and matches the logical unit of storage identified in the modified I/O command. Drive controller 373A may perform the I/O action specified in the modified I/O command. It may be noted that communications sent from drive controllers 373 to storage array controller 110C and 110D may include logical unit identifiers that correspond to the granted reservation, and storage array controller 110C and 110D may modify the communications by replacing the logical unit identifiers with the appropriate host identifiers before sending the modified communications to storage array controller 110A and 110B. In implementations, the firmware of storage drive 171 may be extended (e.g., reservation arbiter 344) to cooperated with a modified reservation 334 or 336 without the coordination between one or more storage processor modules, such as storage array controller 110C and 110D.

Figure 4:
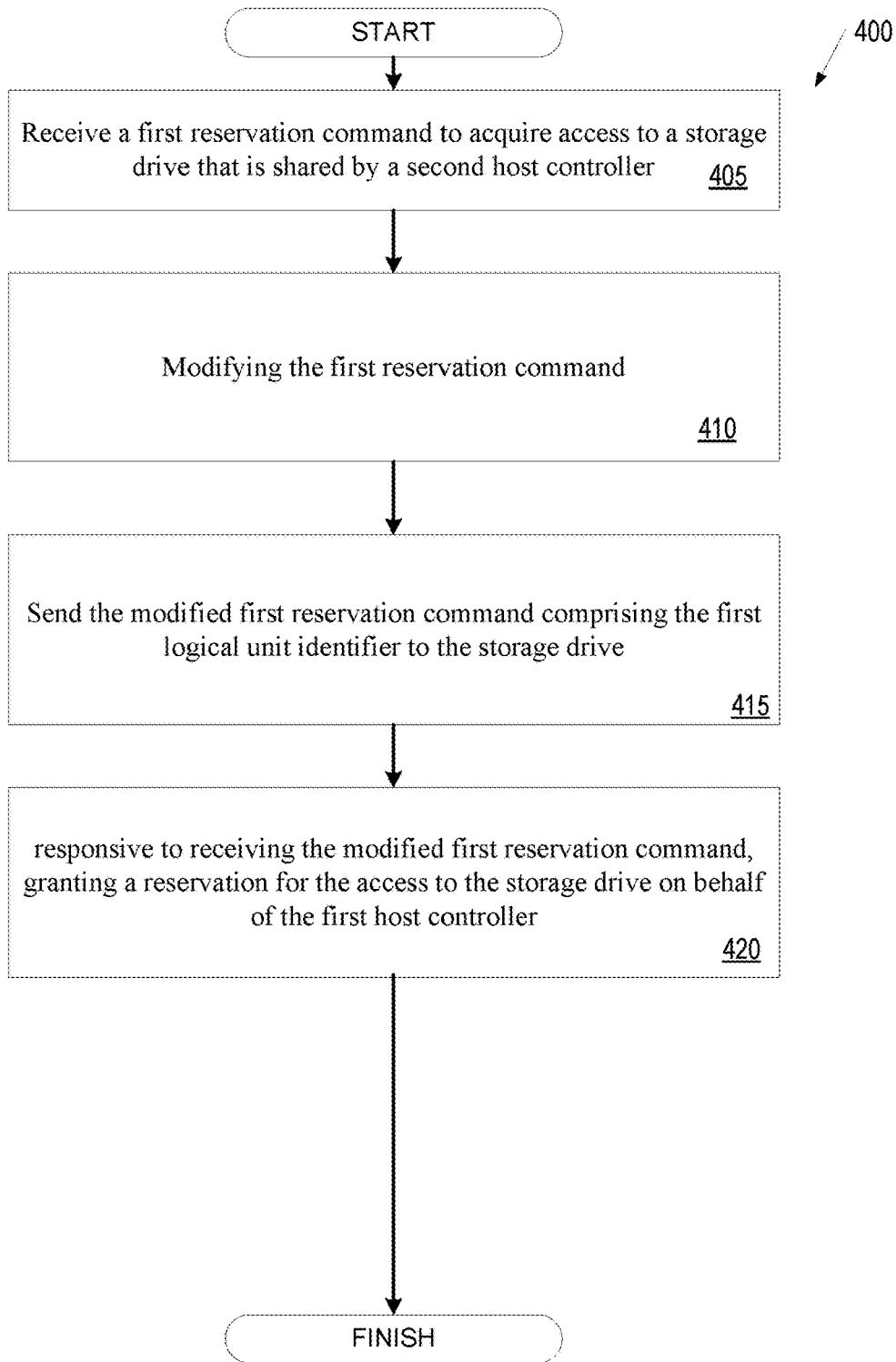
FIG. 4 is a flow diagram illustrating a method for managing reservations over multiple paths, in accordance with some implementations.

FIG. 4 is a flow diagram illustrating a method for managing reservations over multiple paths, in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In one implementation, storage array controllers 110A-D, and drive controllers 373A-B may perform some or all the operations described herein.

Method 400 begins at block 405 where processing logic receives, from a first host controller in a multi-host storage system, a first reservation command to acquire access to a storage drive that is shared by a second host controller of the multi-host storage system. The reservation command includes a first host identifier to identify the first host controller. At block 410, processing logic modifies the first reservation command by replacing the first host identifier with a first logical unit identifier that is associated with the first host controller and that identifies a first logical unit of storage of the storage drive. At block 415, processing logic sends the modified first reservation command including the first logical unit identifier to a drive controller of the storage drive. At block 420, processing logic, responsive to receiving the modified first reservation command, grants a reservation for the access to the storage drive on behalf of the first host controller based on the first logical unit identifier.

Figure 5:
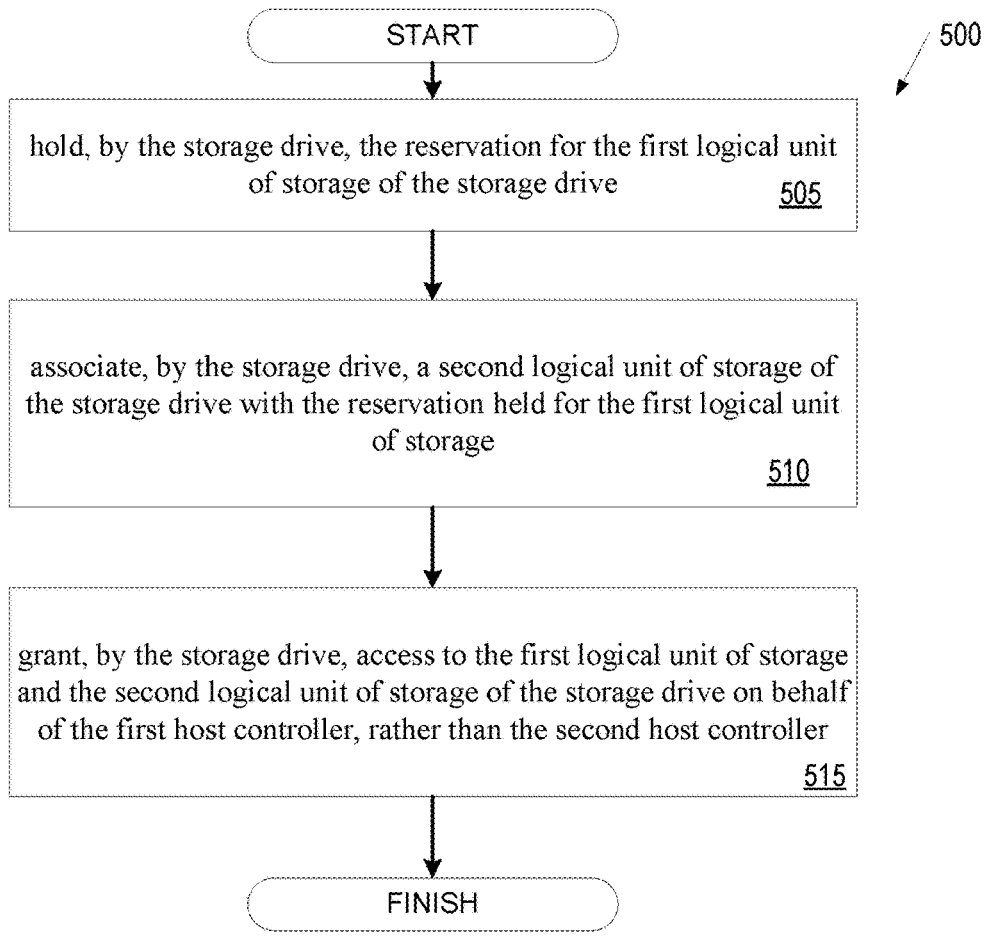
FIG. 5 is a flow diagram illustrating method of granting a reservation for the access to the storage drive, in accordance with some implementations.

FIG. 5 is a flow diagram illustrating method of granting a reservation for the access to the storage drive, in accordance with some implementations. Method 500 may be performed by processing logic that includes hardware (e.g., circuitry, dedicated logic, programmable logic, microcode), software (e.g., instructions run on a processing device to perform hardware simulation), or a combination thereof. In one implementation, storage array controllers 110A-D, and drive controllers 373A-B may perform some or all the operations described herein.

Method 500 begins at block 505 where processing logic holds the reservation for the first logical unit of storage of the storage drive based on the modified first reservation including the first logical unit identifier. At block 510, processing logic associates a second logical unit of storage of the storage drive with the reservation held for the first logical unit of storage. At block 515, processing logic grants access to the first logical unit of storage and the second logical unit of storage of the storage drive on behalf of the first host controller, rather than the second host controller, based on the reservation for the first logical unit.

Figure 6:
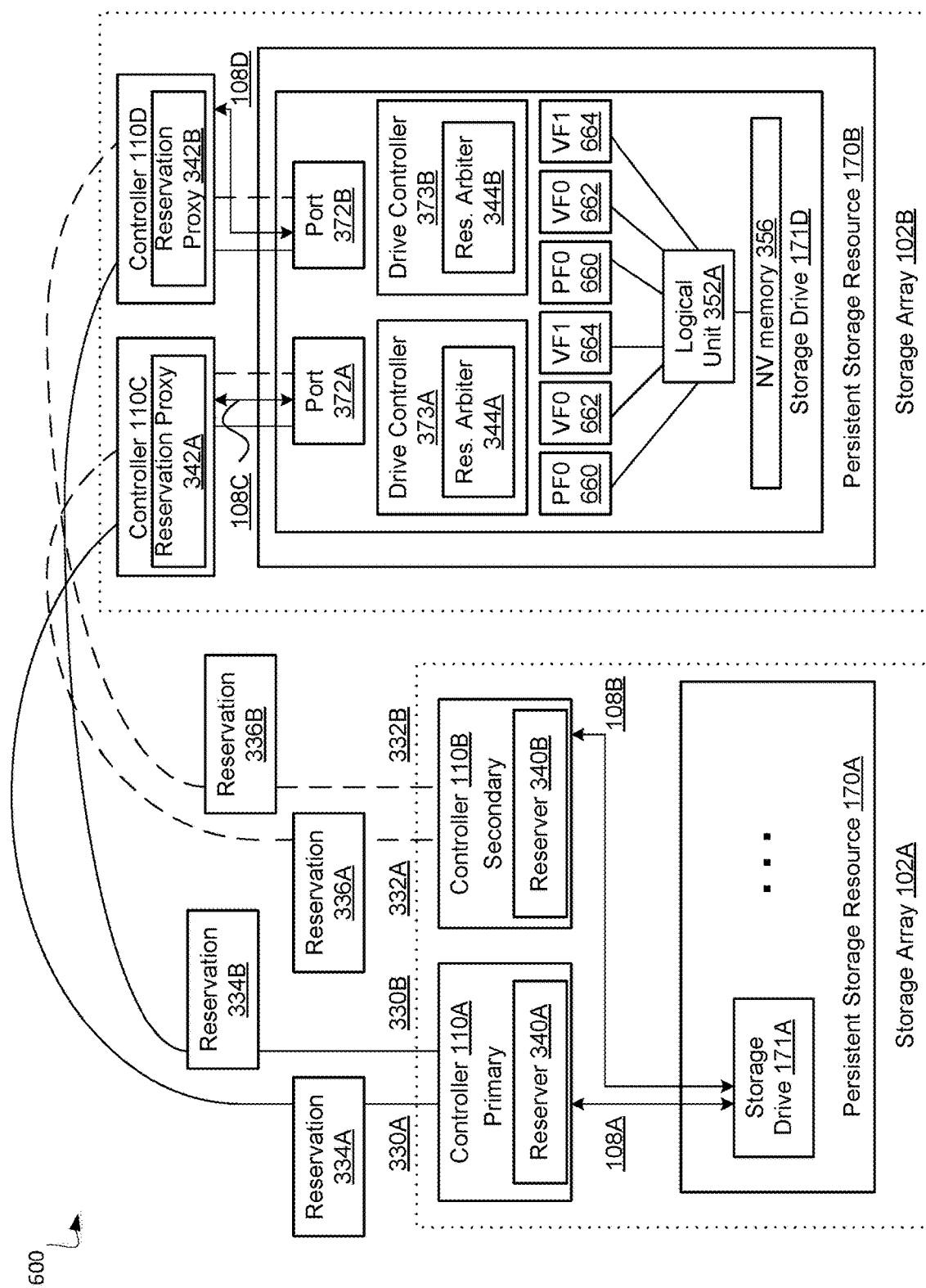
FIG. 6 illustrates an example system for managing reservations using virtualization techniques, in accordance with some implementations.

FIG. 6 illustrates an example system for managing reservations using virtualization techniques, in accordance with some implementations. In some implementations, the virtualization techniques include techniques associated with single root I/O virtualization (SR-IOV) (also referred to as "raw device mapping" (RDM)). In implementations, system 600 illustrated in FIG. 6 may be similar to and include similar elements as system 100 described with respect to FIG. 1 and system 300 described with respect to FIG. 3. Some elements of system 100 and system 300 have been included for purposes of illustration, rather than limitation. Other elements of system 100 and system 300 have not been included so as not to obscure the implementation, rather than for limitation. It may be noted that operations described with respect to system 300, may also be performed using system 600 even if not explicitly described. It may be noted that system 600 may include the same, more, or fewer elements configured in the same or different manner in other implementations. For purposes of illustration, rather than limitation, in system 600 storage array controller 110A is the primary controller (e.g., primary host controller), storage array controller 110B is the secondary controller (e.g., secondary host controller in the multi-host storage system), and storage array controller 110C and 110D are storage processor modules (e.g., storage controller). It may be noted that in other implementations, storage array controllers 110 may have different statuses or functions. For purposes of illustration, rather than limitation, in system 600 persistent storage resource 170B is shown with a single storage drive 171D. In implementations, persistent storage resource 170B may include multiple storage drives 171 with similar features as described with respect to storage drive 171D. It may also be noted the operations described with respect to storage drive 171D, may be performed in a similar manner for and by additional storage drives.

In implementations, SR-IOV may allow each VM or client (e.g., storage array controller 110C or 110D) to have direct access to hardware, such as storage drive 171D, in the form of a virtual function (VF). SR-IOV may allow data, such as storage traffic, to bypass a hypervisor (or virtual machine manager (VMM)) SR-IOV may be supported using internet small computer system interface (iSCSI) or fiber channel (FC) protocols, for example.

In implementations, SR-IOV allows a device (e.g., storage drive 171D) to appear to be multiple separate physical devices. A physical function (PF), such as PF 660, may be a peripheral component interconnect express (PCIe) function that supports SR-IOV capabilities. A virtual function, such as VF 662 and VF 664, may be considered a lightweight or low-cost PCIe function containing the basic PCIe configuration space and resources necessary for data movement. A virtual function may lack configuration resources. The VFs 662 and 664 may be associated with the PF 660 and as such, share the resources of PF 660. The PF 660 may supervise one or more associated VFs, such as VF 662 and VF 664. There may be any suitable number of VFs associated with one PF. In implementations, PF 660 and the associated VFs, such as VF 662 and VF 664, have access to the same logical unit of storage 352A. In implementations, logical unit of storage 352A may be a namespace, such as namespace 1. In implementations, drive controller 373A is communicatively coupled to PF 660 and the associated VFs 662 and 664, and drive controller 373B has is communicatively coupled to the same PF 660 and the associated VFs 662 and 664. In some examples, storage array controller 110A and 110B may communicate to storage array controller 110C and 110D using a protocol consistent with the NVME over Fabrics standard. In some implementations, the storage array controller 110A and 110B may use networked SCSI, such as iSCSI or SCSI Remote Direct Memory Access (RDMA) Protocol (SRP), along with a SCSI to NVMe translation (e.g., NVMe: SCSI translation reference). In some implementations, communication between storage array controllers 110C-110D and drive controllers 373 may be consistent with the NVMe standard (e.g., NVMe over PCIe). In other implementations, communication between storage array controllers 110C-110D and drive controllers 373 may be another storage protocol over PCI, such as a proprietary protocol or SCSI over PCIe (SOP).

In implementations, storage array controller 110A and 110B send reservations 334 and 336, respectively, to another storage array, such as storage array 102B. In implementations, reservations 334A and 334B may include a host identifier that identifies storage array controller 110A.

In implementations, after a reservation is received by storage array controller 110C and 110D, reservation proxy 342 may translate or modify the received reservation. For the sake of illustration, rather than limitation, the flow of reservation 334A through system 300 will be described. It may be noted that other elements receiving reservations other than reservation 334A may perform similar operations. In implementations, reservation 334A includes a host identifier that identifies a sending host controller, such as storage array controller 110A. Reservation proxy 342A of storage array controller 110C may modify reservation 334A by changing the host identifier to a virtual function identifier that is associated with a particular storage array controller, such as storage array controller 110A. The virtual function identifier may identify the particular virtual function (e.g., VF 662 or VF 664) that is associated with a particular host controller.

For example, storage array controller 110C may modify reservation 334A having a host identifier identifying storage array controller 110A with a virtual function identifier identifying logical unit of storage 352A. Similarly, storage array controller 110C may modify reservation 336A having a host identifier identifying storage array controller 110B with a virtual function identifier identifying logical unit of storage 352B. Storage array controller 110C may use a table, common logic, or otherwise, to reference the received host identifier with the associated virtual function identifier.

In implementations, storage array controller 110C may also translate reservation 334A from a first protocol (e.g., fabric-based protocol) to another protocol (e.g., non-fabric protocol). In implementations, a modified reservation may refer to a reservation where at least the host identifier has been replaced with the associated virtual function identifier. In other implementations, a modified reservation may refer to a reservation where the host identifier has been replaced with the associated virtual function identifier and the reservation has been translated consistent with another communication standard.

In implementations, the storage array controller 110C sends the modified reservation 334A to storage drive 171D via port 372A. The modified reservation 334A includes a virtual function identifier that identifies virtual function 662. The modified reservation 334A is passed to drive controller 373A. Reservation arbiter 344A of drive controller 373A, responsive to receiving the modified reservation 334A, checks current reservations for access to virtual function 662. If no other reservations are held for virtual function 662 and no other reservations are associated with virtual function 662, reservation arbiter 344 may grant and hold the reservation for virtual function 662 based on the modified reservation 334A. In implementations, reservation arbiter 344 may associate or tie the reservation for virtual function 662 to another virtual function, such as virtual function 664. It may be noted that without tying the virtual function 662 to the reservation for the virtual function 662, in some implementations a host controller may still be able to access virtual function 664. A reservation held for virtual function 662 and associated with virtual function 664, allows storage drive 171D to grant access to both logical unit of storage 352A in response to an I/O command that includes a virtual functions identifier identifying virtual function 662, and deny access to logical unit of storage 352A in response to an I/O command that includes a virtual function identifier of virtual function 664. A reservation held for virtual function 662 and associated with virtual function 664, is a reservation to the storage drive on behalf of the storage array controller 110A, rather than storage array controller 110B. It may be noted that reservations and I/O commands including virtual function identifiers of virtual functions that are associated with or tied to a reservation held by another virtual function may be denied. In implementations where logical unit of storage 352A represents the total usable storage capacity of the NV memory 356, a reservation held for virtual function 662 and associated with virtual function 664, is a reservation to the entire storage drive 171D on behalf of the storage array controller 110A, rather than storage array controller 110B.

It may also be noted that drive controller 373A and drive controller 373B may communicate directly or through another component, such a common logic block, to coordinate the arbitration of reservations and I/O commands. For example, to determine if a reservation has been granted for virtual function 662 and associated with virtual function 664, drive controllers 373 (responsive to receiving subsequent reservations or I/O commands) may access a common logic block that keeps track of the current reservation.

In implementations, where storage drive 171D holds a reservation on behalf of storage array controller 110A (e.g., a reservation for virtual function 662 that is tied to virtual function 664 and without direct knowledge the reservation is on behalf of storage array controller 110A), storage drive 171D may receive additional reservation commands from storage array controller 110B (via storage array controller 110C or 110D). In one implementation, storage array controller 110C may receive from storage array controller 110B reservation 336A. Reservation 336A may be a reservation command to acquire access (e.g., the same access as storage array controller 110A has been granted) to storage drive 171D. Reservation 336A may include a different host identifier that identifies storage array controller 110B. Storage array controller 110C may determine the association between the host identifier in the reservation 336A and the appropriate virtual function identifier. The associations between host identifiers and virtual function identifiers may be kept in a table or common logic accessible to storage array controller 110C and 110D, for example. Storage array controller 110C may modify reservation 336A to replace the host identifier identifying storage array controller 110B with a virtual function identifier that identifies virtual function 664 (that is associated with storage array controller 110B by storage array controller 110C). Storage array controller 110C may send the modified reservation 336A to drive controller 373A via port 372A. After receiving the modified reservation 336A, drive controller 373A may identify virtual function 664 using the virtual function identifier in modified reservation 336A. Storage array controller 110A may determine that a reservation is being held for virtual function 662 and the reservation is associated with virtual function 664, and deny the reservation for virtual function 664.

In implementations, where storage drive 171D holds a reservation on behalf of storage array controller 110A (e.g., a reservation virtual function 662 that is tied to virtual function 664), storage drive 171D may receive I/O commands from storage array controller 110B. In one implementation, storage array controller 110C may receive from storage array controller 110B an I/O command (e.g., write command). The I/O command may include a host identifier that identifies storage array controller 110B. Storage array controller 110A may determine the association between the host identifier in the I/O command and the appropriate virtual function identifier. Storage array controller 110C may modify the I/O command to replace the host identifier identifying storage array controller 110B with a virtual function identifier that identifies logical unit of storage 352B. Storage array controller 110C may send the modified I/O command to drive controller 373A via port 372A. After receiving the I/O command, drive controller 373A may identify virtual function 664 using the logical unit identifier in I/O command. Storage array controller 110A may determine that a reservation is being held for virtual function 662 and the reservation is associated with virtual function 664, and deny the execution of the I/O action based on the modified I/O command.

In implementations, where storage drive 171D holds a reservation on behalf of storage array controller 110A (e.g., a reservation for virtual function 662 that is tied to virtual function 664), storage drive 171D may receive I/O commands from storage array controller 110A. In one implementation, storage array controller 110C may receive from storage array controller 110A, an I/O command (e.g., write command). The I/O command may include a host identifier that identifies storage array controller 110A. Storage array controller 110A may determine the association between the host identifier in the I/O command and the appropriate virtual function identifier. Storage array controller 110C may modify the I/O command to replace the host identifier identifying storage array controller 110A with a virtual function identifier that identifies logical unit of storage 352A. Storage array controller 110C may send the modified I/O command to drive controller 373A via port 372A. After receiving the I/O command, drive controller 373A may identify virtual function 662 using the virtual function identifier in I/O command. Storage array controller 110A may determine that the reservation is being held for virtual function 662 and that the reservation is associated with virtual function 664, and matches the virtual function 662 identified in the modified I/O command. Drive controller 373A may perform the I/O action specified in the modified I/O command. It may be noted that communications sent from drive controller 373 to storage array controller 110C and 110D may include virtual function identifiers that correspond to the granted reservation, and storage array controller 110C and 110D may modify the communication by replacing the virtual function identifier with the appropriate host identifier before sending the modified communication to storage array controller 110A and 110B.

Figure 7:
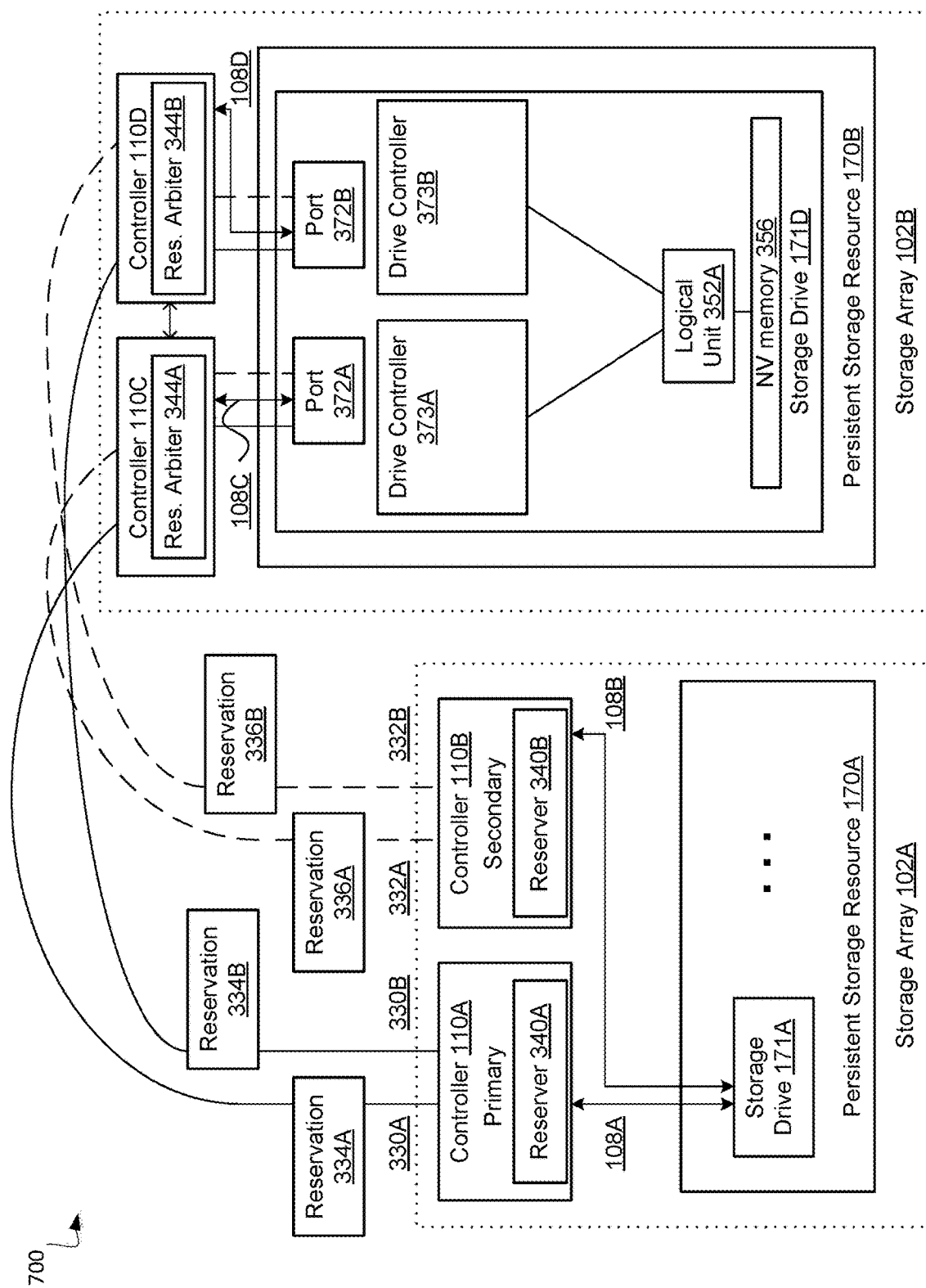
FIG. 7 illustrates an example system for managing reservations using high availability storage controllers, in accordance with some implementations.

FIG. 7 illustrates an example system for managing reservations using high availability storage controllers, in accordance with some implementations. In implementations, system 700 illustrated in FIG. 7 may be similar to and include similar elements as system 100 described with respect to FIG. 1, system 300 described with respect to FIG. 3, and system 600 described with respect to FIG. 6. Some elements of system 100, 300, and 600 have been included for purposes of illustration, rather than limitation. Other elements of system 100, 300, and 600 have not been included so as not to obscure the implementation, rather than for limitation. It may be noted that operations described with respect to system 300 and 600, may also be performed using system 700 even if not explicitly described. It may be noted that system 700 may include the same, more, or fewer elements configured in the same or different manner in other implementations. For purposes of illustration, rather than limitation, in system 700 storage array controller 110A is the primary controller (e.g., primary host controller), storage array controller 110B is the secondary controller (e.g., secondary host controller in the multi-host storage system), and storage array controller 110C and 110D are storage processor modules (e.g., storage controller). It may be noted that in other implementations, storage array controllers 110 may have different statuses or functions. For purposes of illustration, rather than limitation, in system 700 persistent storage resource 170B is shown with a single storage drive 171D. In implementations, persistent storage resource 170B may include multiple storage drives 171 with similar features as described with respect to storage drive 171D. It may also be noted the operations described with respect to storage drive 171D, may be performed in a similar manner for and by additional storage drives.

In implementations, reservation arbitration may be handled by storage array controller 110C and 110D, rather than drive controllers 373. For example, storage array controller 110C and 110D receive reservations 334 and 336, and rather than translate the host identifier in the reservations, storage array controller 110C and 110D grant and hold reservations, and arbitrate I/O commands. In implementations, storage array controller 110C and storage array controller 110D coordinate between themselves (as shown by the arrow between storage array controller 110C and 110D), to perform reservation and I/O command arbitration. It may be noted that storage array controller 110C and 110D may communicate directly or communicate with common logic (not shown) to perform reservation and I/O command arbitration. Storage array controller 110C and 110D may maintain the reservation until the reservation is complete, and pass the appropriate I/O commands to drive controllers 373 when the granted reservation permits. Reservations are handled by storage array controller 110C and 110D, and not passed to storage drive 171D. If I/O commands are received from a host controller other than the host controller holding the reservation, the I/O commands are not passed (blocked) by storage array controller 110C and 110D to storage drive 171D.

In implementations, storage array controller 110A and 110B send reservations 334 and 336, respectively, to another storage array, such as storage array 102B. Reservations 334 and 336 may be requests or commands that allow two or more host controllers (e.g., storage array controller 110A and 110B) to coordinate access (e.g., read access, write access, erase access, etc.) to a storage drive, such as storage drive 171D. In implementations, reservations 334A and 334B may include a host identifier that identifies storage array controller 110A.

In implementations, the reservations 334 and 336 may be sent via multipath. For example, reservations 334A and 334B may be sent by storage array controller 110A to storage array controller 110C and 110D, respectively. Similarly, reservations 336A and 336B may be sent by storage array controller 110B to storage array controller 110C and 110D, respectively. In implementations, reservations 334A and 334B may include the same content, but be sent to different devices, such as storage array controller 110C and 110D, respectively. Similarly, reservations 336A and 336B may include the same content, but be sent to different devices, such as storage array controller 110C and 110D, respectively.

In implementations, after a reservation is received by storage array controller 110C and 110D, reservation arbiter 344 identifies the host controller using the host identifier in the reservation. For the sake of illustration, rather than limitation, the flow of reservation 334A through system 300 will be described. It may be noted that other elements receiving reservations other than reservation 334A may perform similar operations. In implementations, reservation 334A includes a host identifier that identifies a sending host controller, such as storage array controller 110A. In implementations, the reservation 334A may be sent in a fabric-based protocol.

Reservation arbiter 344A of storage array controller 110C, responsive to receiving the reservation 334A, checks the current reservation status for access to logical unit of storage 352A using the host identifier in reservation 334A. It may be noted that logical unit of storage 352A may be namespace 1 in an implementation. It may also be noted that storage array controller 110C and storage array controller 110D may communicate directly or through another component, such a common logic block (not shown), to coordinate the arbitration of reservations and I/O commands. For example, to determine if a reservation has been granted for storage array controller 110A, storage array controller 110C (responsive to receiving subsequent reservations or I/O commands) may access a common logic block that keeps track of the current reservation status.

In implementations, to determine if a reservation is being held, storage array controller 110C may access a master reservation holder held in a common logic block. A master reservation holder may hold information regarding the current reservation status and include information such as type of access and holder of the reservation. The master reservation holder may be common and accessible to both storage array controller 110C and 100D, where both storage array controller 110C and 110D are able to read and write to the master reservation holder. In other implementations, storage array controller 110C and storage array controller 110D may each hold information regarding the reservation status, and communicate to one another in response to a reservation to determine if both storage array controller 110C and 110D reflect the same reservation status, determine whether to grant the received reservation, and coordinate the information for the reservation status for both storage array controllers 110C and 110D. It may be noted that the reservation status of each storage drive 171 of storage array 102B may be managed by storage array controllers 110C and 110D.

In implementations, responsive to receiving reservation 334A, storage array controller 110C may check the reservation status. If no reservations are held for storage array controller 110B, reservation arbiter 344 may grant and hold the reservation for storage array controller 110A based on the reservation 334A and associate the reservation with storage array controller 110B. In implementations, reservation arbiter 344 may update the reservation status on the master reservation holder to indicate that storage array controller 110A currently holds the reservation for access. In other implementations, storage array controller 110C may send the reservation 334A (or other information representing a reservation on behalf of storage array controller 110A) to storage array controller 110D. Storage array controller 110D may update the local reservation status associated with storage array controller 110D, and send a response back to storage array controller 110C. Storage array controller 110C may send a confirmation of the reservation to storage array controller 110A. It may be noted that if a reservation for access is held for storage array controller 110A, a reservation for storage array controller 110B will be denied, and vice versa.

In implementations, responsive to determining the reservation statuses of storage array controller 110C and 110D are not the same, the storage array controller 110C and 110D may pause processing of I/O commands and updated the reservation statuses for both storage array controller 110C and 110D with the received reservation.

In implementations, storage array controller 110C and 110D may tie or associate a host controller to a reservation held by another host controller. It may be noted that reservations and I/O commands including host identifiers of host controllers that are associated with or tied to a reservation held by another host controller may be denied In implementations where logical unit of storage 352A represents the total usable storage capacity of the NV memory 356, a reservation held for storage array controller 110A, is a reservation to the entire storage drive 171D on behalf of the storage array controller 110A, rather than storage array controller 110B.

In implementations, where storage array controller 110C and 110D hold a reservation for storage array controller 110A and the reservation is associated with storage array controller 110B, storage array controller 110C and 110D may receive additional reservation commands from storage array controller 110B. In one implementation, storage array controller 110C may receive from storage array controller 110B reservation 336A. Reservation 336A may be a reservation command to acquire access (e.g., the same access as storage array controller 110A has been granted) to storage drive 171D. Reservation 336A may include a different host identifier that identifies storage array controller 110B. Storage array controller 110C may identify the storage array controller 110B using the host identifier in reservation 336A. Storage array controller 110A may determine that a reservation is being held for storage array controller 110A and the reservation is associated with storage array controller 110B using reservation status information, and deny the reservation by storage array controller 110B.

In implementations, where storage array controller 110C and 110D hold a reservation for storage array controller 110A and the reservation is associated with storage array controller 110B, storage drive 171C may receive I/O commands from storage array controller 110B. In one implementation, storage array controller 110C may receive from storage array controller 110B an I/O command (e.g., write command). The I/O command may include a host identifier that identifies storage array controller 110B. After receiving the I/O command, storage array controller 110B may compare the host identifier with the reservation status information. Storage array controller 110C may determine that a reservation is being held for storage array controller 110A and the reservation is associated with storage array controller 110B, and prevent the command from being send to storage drive 171 (e.g. drive controller 373A).

In implementations, where storage array controller 110C and 110D hold a reservation on behalf of storage array controller 110A and the reservation is associated with storage array controller 110B, storage array controller 110C may receive I/O commands from storage array controller 110A. In one implementation, storage array controller 110C may receive from storage array controller 110A, an I/O command (e.g., write command). The I/O command may include a host identifier that identifies storage array controller 110A. After receiving the I/O command, storage array controller 110C may determine that the reservation that is being held for storage array controller 110A matches the host identifier in the I/O command. Responsive to determining the I/O command is requested by a host controller that holds the reservation, storage array controller 110C may pass the I/O command to drive controller 373A. Drive controller 373A may perform the I/O action specified in the I/O command. It may be noted that storage array controller 110C may translate the I/O command into another protocol, such as a non-fabric-based protocol.

Figure 8:
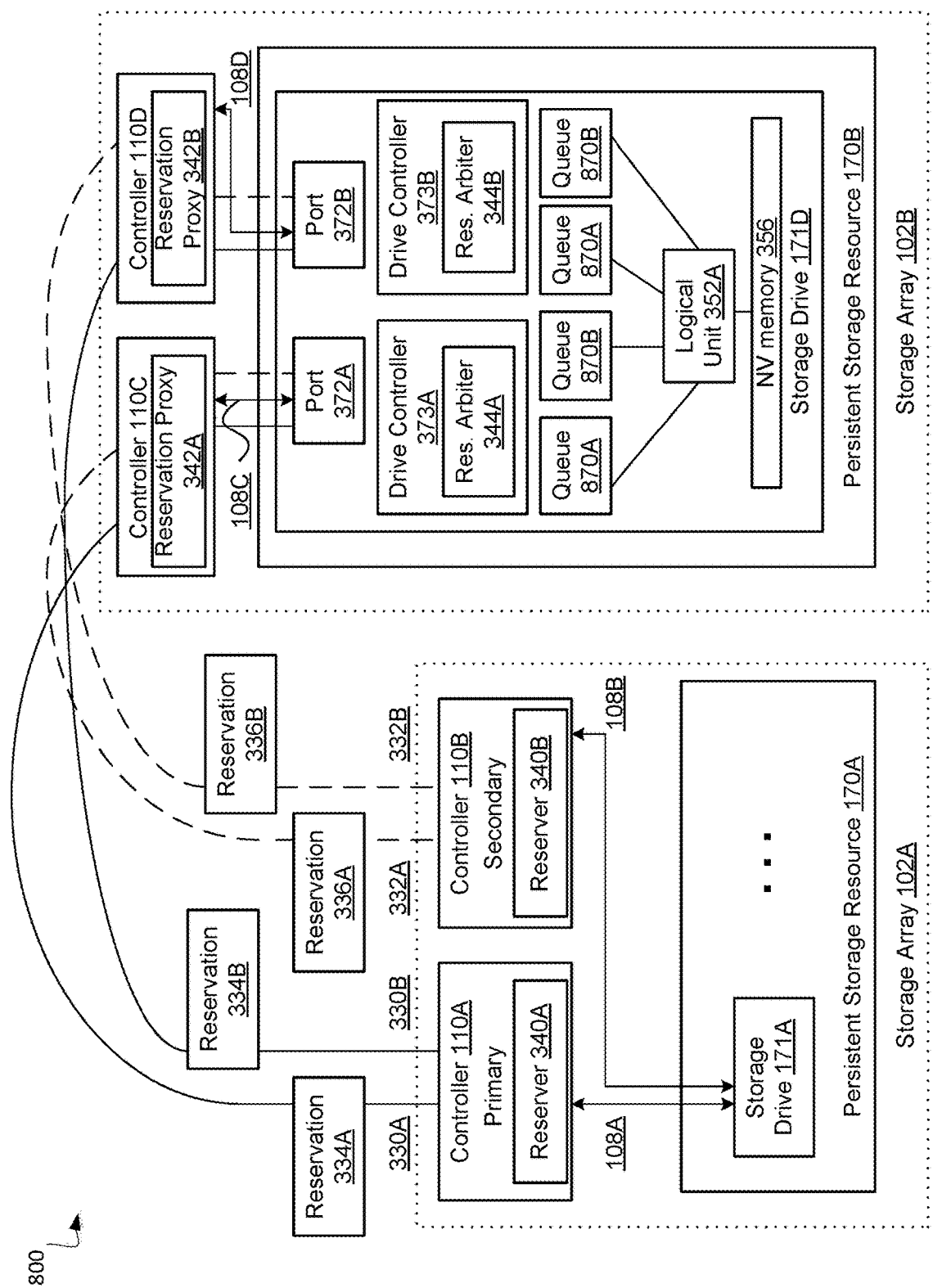
FIG. 8 illustrates an example system for managing reservations using submission queues, in accordance with some implementations.

FIG. 8 illustrates an example system for managing reservations using submission queues, in accordance with some implementations. In implementations, system 800 illustrated in FIG. 8 may be similar to and include similar elements as system 100 described with respect to FIG. 1, system 300 described with respect to FIG. 3, and system 600 described with respect to FIG. 6. Some elements of system 100, 300, and 600 have been included for purposes of illustration, rather than limitation. Other elements of system 100, 300, and 600 have not been included so as not to obscure the implementation, rather than for limitation. It may be noted that operations described with respect to system 300 and 600, may also be performed using system 800 even if not explicitly described. It may be noted that system 800 may include the same, more, or fewer elements configured in the same or different manner in other implementations. For purposes of illustration, rather than limitation, in system 800 storage array controller 110A is the primary controller (e.g., primary host controller), storage array controller 110B is the secondary controller (e.g., secondary host controller in the multi-host storage system), and storage array controller 110C and 110D are storage processor modules (e.g., storage controller). It may be noted that in other implementations, storage array controllers 110 may have different statuses or functions. For purposes of illustration, rather than limitation, in system 800 persistent storage resource 170B is shown with a single storage drive 171D. In implementations, persistent storage resource 170B may include multiple storage drives 171 with similar features as described with respect to storage drive 171D. It may also be noted the operations described with respect to storage drive 171D, may be performed in a similar manner for and by additional storage drives.

In implementations, one or more submission queues, such as submission queues 870, may be created for storage drive 171D. In implementations, submission queues 870 may conform to the NVMe standard. Submission queue commands (e.g., I/O commands) may be placed into a submission queue 870, by storage array controller 110C and 110D, for example. Multiple submission queues 870 may be created. In implementations, the number of submission queues 870 may the same or greater than the number of host controllers. Submission queue commands may include identifiers such as a submission queue identifier (SQUID), a command identifier (CMID), and a port identifier (PID). It may be noted that the following description may describe implementations using the submission queue identifier, for purposes of illustration rather than limitation. It may also be noted that other submission queue command identifiers may also be implemented in a similar matter, even if not explicitly described.

In implementations, storage array controller 110A and 110B send reservations 334 and 336, respectively, to another storage array, such as storage array 102B. Reservations 334 and 336 may be requests or commands that allow two or more host controllers (e.g., storage array controller 110A and 110B) to coordinate access (e.g., read access, write access, erase access, etc.) to a storage drive, such as storage drive 171D. In implementations, reservations 334A and 334B may include a host identifier that identifies storage array controller 110A.

In implementations, after a reservation is received by storage array controller 110C and 110D, reservation proxy 342 may translate or modify the received reservation. For the sake of illustration, rather than limitation, the flow of reservation 334A through system 300 will be described. It may be noted that other elements receiving reservations other than reservation 334A may perform similar operations. In implementations, reservation 334A includes a host identifier that identifies a sending host controller, such as storage array controller 110A Reservation proxy 342A of storage array controller 110C may modify reservation 334A by changing the host identifier to submission queue identifier that is associated with a particular storage array controller, such as storage array controller 110A. The submission queue identifier may identify the particular submission queue 870A or 870B that is associated with a particular host controller.

For example, storage array controller 110C may modify reservation 334A having a host identifier identifying storage array controller 110A with a submission queue identifier identifying logical unit of storage 352A. Similarly, storage array controller 110C may modify reservation 336A having a host identifier identifying storage array controller 110B with a submission queue identifier identifying logical unit of storage 352B. Storage array controller 110C may use a table, common logic, or otherwise, to reference the received host identifier with the associated submission queue identifier.

In implementations, storage array controller 110C may also translate reservation 334A from a first protocol (e.g., fabric-based protocol) to another protocol (e.g., non-fabric protocol). In implementations, a modified reservation may refer to a reservation where at least the host identifier has been replaced with the associated submission queue identifier. In other implementations, a modified reservation may refer to a reservation where the host identifier has been replaced with the associated submission queue identifier and the reservation has been translated consistent with another communication standard.

In implementations, the storage array controller 110C sends the modified reservation 334A to storage drive 171D via port 372A. The modified reservation 334A includes a submission queue identifier that identifies submission queue 870A. The modified reservation 334A is passed to drive controller 373A. Reservation arbiter 344A of drive controller 373A, responsive to receiving the modified reservation 334A, checks current reservations for access to submission queue 870A. If no other reservations are held for submission queue 870A and no other reservations are held for submission queue 870B that are associated with submission queue 870A, reservation arbiter 344 may grant and hold the reservation for submission queue 870A based on the modified reservation 334A. In implementations, reservation arbiter 344 may associate or tie the reservation for submission queue 870A to another submission queue, such as submission queue 870B. It may be noted that without tying the submission queue 870B to the reservation for the submission queue 870A, in some implementations a host controller may still be able to access submission queue 870B. A reservation held for submission queue 870A and associated with submission queue 870B, allows storage drive 171D to grant access to logical unit of storage 352A in response to an submission queue command that includes a submission queue identifier to identify submission queue 870A, and deny access to logical unit of storage 352A in response to an submission queue command that includes a submission queue identifier of submission queue 870B. A reservation held for submission queue 870A and associated with submission queue 870B, is a reservation to the storage drive on behalf of the storage array controller 110A, rather than storage array controller 110B. It may be noted that reservations and I/O commands including submission queue identifiers of submission queues that are associated with or tied to a reservation held by another submission queue may be denied. In implementations where logical unit of storage 352A represents the total usable storage capacity of the NV memory 356, a reservation held for submission queue 870A and associated with submission queue 870B, is a reservation to the entire storage drive 171D on behalf of the storage array controller 110A, rather than storage array controller 110B.

It may also be noted that drive controller 373A and drive controller 373B may communicate directly or through another component, such a common logic block, to coordinate the arbitration of reservations and I/O commands. For example, to determine if a reservation has been granted for submission queue 870A and associated with submission queue 870B, drive controllers 373 (responsive to receiving subsequent reservations or submission queue commands) may access a common logic block that keeps track of the current reservation.

In implementations, where storage drive 171D holds a reservation on behalf of storage array controller 110A (e.g., a reservation for submission queue 870A that is tied to submission queue 870B and without direct knowledge the reservation is on behalf of storage array controller 110A), storage drive 171D may receive additional reservation commands from storage array controller 110B (via storage array controller 110C or 110D). In one implementation, storage array controller 110C may receive from storage array controller 110B reservation 336A. Reservation 336A may be a reservation command to acquire access (e.g., the same access as storage array controller 110A has been granted) to storage drive 171D. Reservation 336A may include a different host identifier that identifies storage array controller 110B. Storage array controller 110C may determine the association between the host identifier in the reservation 336A and the appropriate submission queue identifier. Storage array controller 110C may modify reservation 336A to replace the host identifier identifying storage array controller 110B with a submission queue identifier that identifies submission queue 870B (that is associated with storage array controller 110B by storage array controller 110C). Storage array controller 110C may send the modified reservation 336A to drive controller 373A via port 372A. After receiving the modified reservation 336A, drive controller 373A may identify submission queue 870B using the virtual function identifier in modified reservation 336A. Storage array controller 110A may determine that a reservation is being held for submission queue 870A and the reservation is associated with submission queue 870B, and deny the reservation for submission queue 870B.

In implementations, where storage drive 171D holds a reservation on behalf of storage array controller 110A (e.g., a reservation submission queue 870A that is tied to submission queue 870B), storage drive 171D may receive I/O command from storage array controller 110B. In one implementation, storage array controller 110C may receive from storage array controller 110B an I/O command (e.g., write command). The I/O command may include a host identifier that identifies storage array controller 110B. Storage array controller 110A may determine the association between the host identifier in the I/O command and the appropriate submission queue identifier. Storage array controller 110C may modify the I/O command to replace the host identifier identifying storage array controller 110B with a submission queue identifier that identifies logical unit of storage 352B, and change the format of the I/O command into a submission queue command. Storage array controller 110C may send the modified submission queue command to drive controller 373A via port 372A. After receiving the modified submission queue command, drive controller 373A may identify submission queue 870B using the submission queue identifier in modified submission queue command. Storage array controller 110A may determine that a reservation is being held for submission queue 870A and the reservation is associated with submission queue 870B, and deny the execution of the I/O action based on the modified submission queue command.

In implementations, where storage drive 171D holds a reservation on behalf of storage array controller 110A (e.g., a reservation for submission queue 870A that is tied to submission queue 870B), storage drive 171D may receive I/O commands from storage array controller 110A. In one implementation, storage array controller 110C may receive from storage array controller 110A, an I/O command (e.g., write command). The I/O command may include a host identifier that identifies storage array controller 110A. Storage array controller 110A may determine the association between the host identifier in the I/O command and the appropriate submission queue identifier. Storage array controller 110C may modify the I/O command to replace the host identifier identifying storage array controller 110A with a submission queue identifier that identifies submission queue 870A. Storage array controller 110C may send the modified submission queue command to drive controller 373A via port 372A. After receiving the modified submission queue command, drive controller 373A may identify submission queue 870A using the submission queue identifier in modified submission queue command. Storage array controller 110A may determine that the reservation is being held for submission queue 870A and that the reservation is associated with submission queue 870B, and matches the submission queue 870A identified in the modified submission queue command. Drive controller 373A may perform the I/O action specified in the modified submission queue 870 command. It may be noted that communications sent from drive controller 373 to storage array controller 110C and 110D may include submission queue identifiers that correspond to the granted reservation, and storage array controller 110C and 110D may modify the communication by replacing the submission queue identifier with the appropriate host identifier before sending the modified communication to storage array controller 110A and 110B.

In some embodiments where reservation arbitration or I/O command arbitration is performed at the storage drive 373, for example, storage drive 171 may reject I/O commands on a port (e.g., port 372B) with a status indicating that an I/O action is currently not allowed on the port. In implementations, drive controller 373 may reject I/O commands on a port pursuant to some logic. For instance, drive controller 373A may proceed to reject I/O commands on port 372B in response to granting a reservation 334A.

Figure 9:
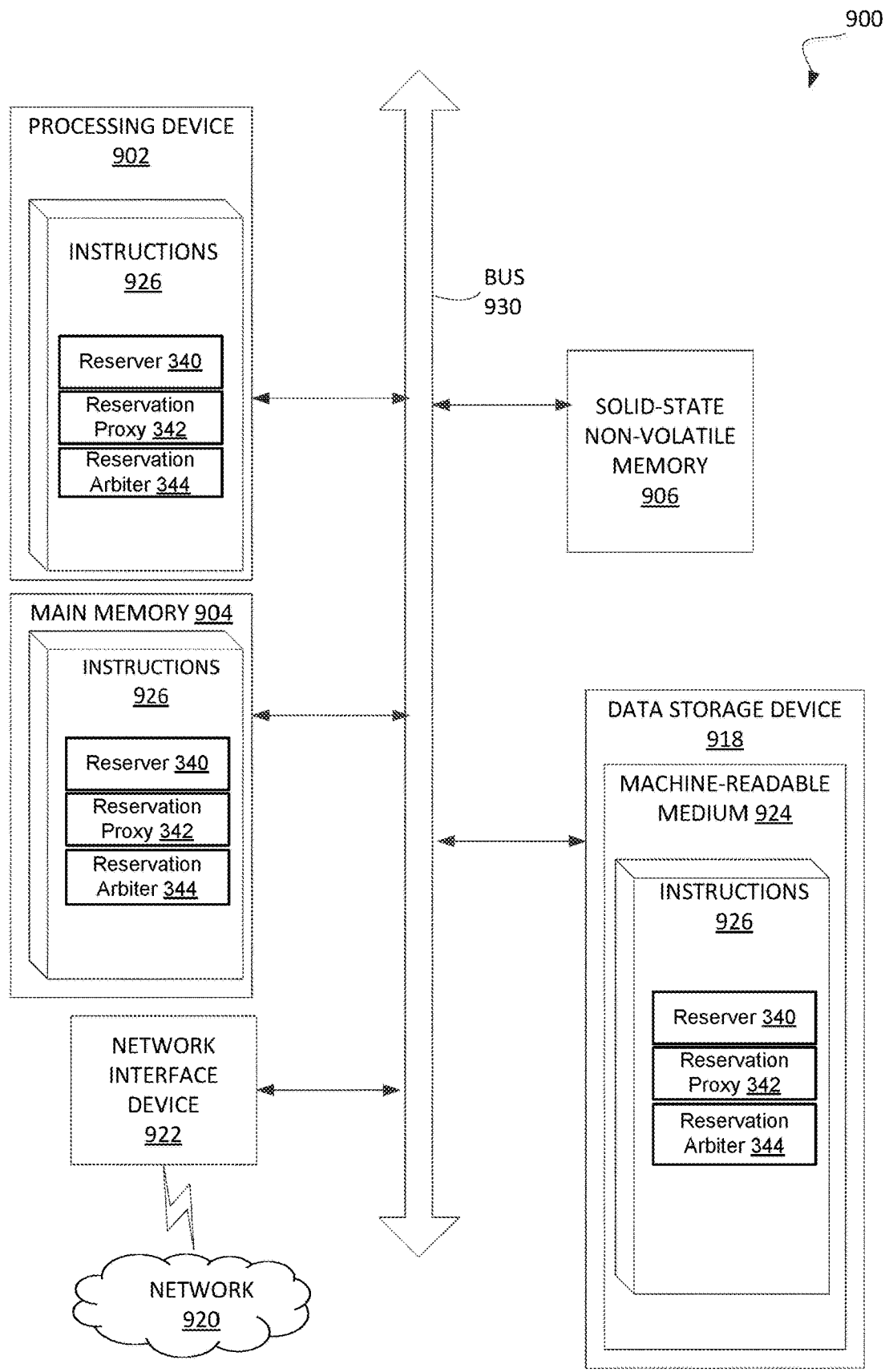
FIG. 9 depicts an example computer system 900 which can perform any one or more of the methods described herein.

FIG. 9 depicts an example computer system 900 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a solid-state non-volatile memory 906 (e.g., flash memory, 3D crosspoint memory, magnetoresistive random-access memory (MRAM), or any other such storage media that does not use a physical disk), and a data storage device 918, which communicate with each other via a bus 930.

Processing device 902 represents one or more general-purpose processing devices such as a microprocessor, central processing unit, or the like. In implementations, processing device 902 may be one or more or storage array controller 110A, 110B, 110C, or 100D, drive controller 373A or 373B, or other components described herein. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute a reserver 340, reservation proxy 342, or reservation arbiter 344 for performing any of operations discussed herein. The computer system 900 may further include a network interface device 922. The data storage device 918 may include a computer-readable storage medium 924 on which is stored reserver 340, reservation proxy 342, or reservation arbiter 344 embodying any one or more of the methodologies or functions described herein. The reserver 340, reservation proxy 342, or reservation arbiter 344 may also reside, completely or at least partially, within the main memory 904 and/or within the processing device 902 during execution thereof by the computer system 900, the main memory 904 and the processing device 902 also constituting computer-readable media. The reserver 340, reservation proxy 342, or reservation arbiter 344 may further be transmitted or received over a network via the network interface device 922.

While the computer-readable storage medium 924 is shown in the illustrative examples to be a single medium, the term "computer-readable storage medium" (e.g., "non-transitory computer-readable storage medium") may be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure may, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "identifying," "granting," "holding," "associating," "modifying," "sending," "denying," "determining," "sending," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method operations. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any method for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
responsive to receiving a modified first reservation command from a storage controller, identifying, by a storage drive, a first logical unit of storage based on a first logical unit identifier of the modified reservation command; and
granting, by the storage drive, a reservation for access to the storage drive on behalf of a first host controller by associating the reservation for the first logical unit with a second logical unit of storage.

2. The method of claim 1, wherein granting, by the storage drive, the reservation to the access to the storage drive by associating the reservation for the first logical unit with a second logical unit of storage, further comprises:

holding, by the storage drive, the reservation for the first logical unit of storage of the storage drive based on the first reservation comprising the first logical unit identifier;

associating, by the storage drive, a second logical unit of storage of the storage drive with the reservation held for the first logical unit of storage; and granting, by the storage drive, access to the first logical unit of storage and the second logical unit of storage of the storage drive on behalf of the first host controller, rather than a second host controller, based on the reservation for the first logical unit.

3. The method of claim 2, further comprising:

modifying, by the storage drive, a second reservation command comprising a second host identifier to identify the second host controller by replacing the second host identifier with a second logical unit identifier that is associated with the second host controller and that identifies a second logical unit of storage of the storage drive;

sending the modified second reservation command comprising the second logical unit identifier to the storage drive; and responsive to receiving the modified second reservation command, denying a reservation made using the modified second reservation command based on the reservation held for the first logical unit.

4. The method of claim 3, wherein responsive to receiving the modified second reservation command, denying the reservation made using the modified second reservation command based on the granted reservation for the access to the storage drive comprises:

identifying, based in the modified second reservation, the second logical unit of storage of the storage drive;

determining, by the storage drive, that the reservation is held for the first logical unit of storage and the reservation is associated with the second logical unit of storage; and denying the reservation made using the modified second reservation comprising the second logical unit identifier.

5. The method of claim 1, further comprising:

receiving, from a first host controller, an input-output (I/O) command to access to the storage drive, the I/O command comprising the first host identifier to identify the first host controller;

modifying, by the storage drive, an I/O command by replacing the first host identifier with the first logical unit identifier that is associated with the first host controller;

sending the modified I/O command comprising the first logical unit identifier to the storage drive;

determining, by the storage drive, that the first logical identifier of the modified I/O command matches a logical unit identifier for which the reservation was granted; and responsive to determining that the first logical identifier of the modified I/O command matches a logical unit identifier for which the reservation was granted, performing an I/O action specified by the modified I/O command.

6. The method of claim 1, wherein the access to the storage drive comprises a write access, a read access, or a read-write access.

7. The method of claim 1, wherein the first reservation command is compatible with a Nonvolatile Memory Express (NVMe) over Fabrics standard, and the modified first reservation command is compatible with a NVMe standard.

8. The method of claim 1, wherein first logical unit identifier is a first namespace identifier that identifies a first namespace that is the first logical unit of storage of the storage drive.

9. The method of claim 2, wherein a second logical unit identifier is a second namespace identifier that identifies a second namespace that is the second logical unit of storage of the storage drive.

10. The method of claim 2, wherein the first logical unit and the second logical unit represent a same physical storage of the storage drive.

11. A multi-host storage system comprising
a memory;
a storage controller, communicatively coupled to the memory, to:
receive, from a first host controller of the multi-host storage system, a first reservation command to acquire access to a storage drive that is shared by a second host controller of the multi-host storage system, the reservation command comprising a first host identifier to identify the first host controller;
modify the first reservation command by replacing the first host identifier with a first logical unit identifier that is associated with the first host controller and that identifies a first logical unit of storage of the storage drive; and
send the modified first reservation command comprising the first logical unit identifier to a drive controller of the storage drive.

12. The multi-host storage system of claim 11, the storage controller further to:
receive, from the second host controller, a second reservation command to acquire the access to the storage drive, the reservation command comprising a second host identifier to identify the second host controller;
modify the second reservation command by replacing the second host identifier with a second logical unit identifier that is associated with the second host controller and that identifies a second logical unit of storage of the storage drive; and
send the modified second reservation command comprising the second logical unit identifier to the drive controller of the storage drive.

13. The multi-host storage system of claim 11, wherein the access to the storage drive comprises a write access, a read access, or a read-write access.

14. The multi-host storage system of claim 11, wherein the first reservation command is compatible with a Nonvolatile Memory Express (NVMe) over Fabrics standard, and the modified first reservation command is compatible with a NVMe standard.

15. A non-transitory computer-readable medium comprising instructions that, when executed by a multi-host storage system, cause the multi-host storage system to:
receive, by a storage drive of the multi-host storage system, a modified first submission queue command comprising a first logical unit identifier, wherein a first submission queue command comprises a first host identifier;

responsive to receiving the modified first submission queue command, identify, by the storage drive, a first logical unit of storage based on the first logical unit identifier of the modified submission queue command; and grant, by the storage drive, a reservation for access to the storage drive on behalf of the first host controller by associating the reservation for the first logical unit with a second logical unit of storage.

16. The non-transitory computer-readable medium of claim 15, wherein the submission queue command is an I/O command.

17. The non-transitory computer-readable medium of claim 16, wherein the I/O command is a write command.

18. The non-transitory computer-readable medium of claim 15, wherein the I/O command is a read command.

19. The non-transitory computer-readable medium of claim 15, wherein the I/O command is a flush command.

20. The non-transitory computer-readable medium of claim 15, wherein the flush command is configured to move data to the storage drive.

\* \* \* \* \*